US005243363A

United States Patent [19]

Koizumi et al.

[11] Patent Number: 5,243,363

[45] Date of Patent: Sep. 7, 1993

[54] INK-JET RECORDING HEAD HAVING BUMP-SHAPED ELECTRODE AND PROTECTIVE LAYER PROVIDING STRUCTURAL SUPPORT

[75] Inventors: Yutaka Koizumi; Yasutomo Watanabe, both of Tokyo, Japan

[73] Assignee: Canon Kabushiki Kaisha, Tokyo, Japan

[21] Appl. No.: 831,642

[22] Filed: Feb. 7, 1992

Related U.S. Application Data

[63] Continuation of Ser. No. 690,340, Apr. 25, 1991, abandoned, which is a continuation of Ser. No. 383,085, Jul. 21, 1989, abandoned.

[30] Foreign Application Priority Data

| | | | |
|---|---|---|---|
| Jul. 22, 1988 | [JP] | Japan | 63-182880 |
| Jul. 7, 1989 | [JP] | Japan | 1-174049 |
| Jul. 7, 1989 | [JP] | Japan | 1-174050 |
| Jul. 7, 1989 | [JP] | Japan | 1-174051 |
| Jul. 7, 1989 | [JP] | Japan | 1-174052 |

[51] Int. Cl.[5] .......... G01D 15/16

[52] U.S. Cl. .......... 346/140 R; 361/785; 439/67

[58] Field of Search .......... 346/140 R; 439/67, 74; 361/413

[56] References Cited

U.S. PATENT DOCUMENTS

| | | | |
|---|---|---|---|
| 4,420,203 | 12/1983 | Aug | 439/67 |
| 4,719,477 | 1/1988 | Hess | 346/140 |
| 4,813,129 | 3/1989 | Karnezos | 439/74 X |
| 4,862,197 | 8/1989 | Stoffel | 346/140 |

FOREIGN PATENT DOCUMENTS

| | | |
|---|---|---|
| 0344809 | 12/1989 | European Pat. Off. . |
| 59-111338 | 6/1984 | Japan . |
| 16861 | 1/1986 | Japan . |
| 61-029551 | 2/1986 | Japan . |

OTHER PUBLICATIONS

"An Inexpensive, Portable Ink-Jet Printer Family", C. Katen, et al., Hewlett-Packard Journal,, May 1985, vol. 36, No. 5, p. 14.

*Primary Examiner*—Joseph W. Hartary
*Attorney, Agent, or Firm*—Fitzpatrick, Cella, Harper & Scinto

[57] ABSTRACT

A recording element unit includes a support member, a recording element provided on the support member and having a wiring layer for supplying electrical signals, and a bump-shaped electrode connected to the wiring layer so as to be raised therefrom. The bump-shaped electrode includes a plurality of raised portions. Such a bump-shaped electrode is also included in a recording element driving unit, an ink jet unit, and an ink jet driving unit. This arrangement solves the problem of the low reliability of the electrical connection between a recording element substrate, on which the electrode is positioned, and a driving element substrate, for driving the recording element. The unit also includes first and second protective layers with the second protective layer having a thickness greater than that of the first. This feature provides structural strength to the support member in order to prevent warping.

9 Claims, 19 Drawing Sheets

705
702
701
b
b'

705a
705b
c
c'

708
706 b
b'
1105
1102
1101 b c
b' c'
1102
1105
1101

1108
1106

1106

INK-JET RECORDING HEAD HAVING BUMP-SHAPED ELECTRODE AND PROTECTIVE LAYER PROVIDING STRUCTURAL SUPPORT

This application is a continuation of application Ser. No. 07/690,340 filed Apr. 25, 1991, which is a continuation of Ser. No. 07/383,085 filed Jul. 21, 1989, both now abandoned.

BACKGROUND OF THE INVENTION

1. Field of the Invention

This invention relates to a recording element unit, and a recording element driving unit, an ink jet unit, an ink jet driving unit and an ink jet device by use thereof.

2. Related Background Art

As the recording element unit to be used for an ink jet recording device, etc., for example, a recording element unit as shown in FIG. 19 (*a*) has been known as the prior art. Also, a sectional view taken along A—A' in FIG. 19 (*a*) is shown in FIG. 19 (*b*).

In FIG. 19 (*a*) and FIG. 19 (*b*), 1501 is a holding member, 1502 is a $HfB_2$ layer as the heat-generating resistance layer, 1503 is the common electrode of Al, 1504 are the individual electrodes of Al, 1505*a* are and 1505*b* are pattern wirings of Al, 1506 is a $SiO_2$ layer as the oxidation resistant layer and the insulating layer, 1507 is a photosensitive polyimide layer as the ink resistant layer and the insulating layer, and 1508 is a Ta layer as the cavitation resistant layer.

The recording element unit as shown in FIG. 19 (*a*) and FIG. 19 (*b*) passes current to the $HfB_2$ layer 1502 as the heat-generating resistance layer, thereby generating heat energy from the $HfB_2$ layer. More specifically, by permitting the driving current to flow into the $HfB_2$ layer externally through the individual electrodes 1504 and the pattern wirings 1505*a*, and further permitting the current to flow out externally through the pattern wirings 1505*b* and the common electrode 1503, heat energy can be generated at the $HfB_2$ layer. In the ink jet recording device, recording is performed by discharging liquid utilizing heat energy.

Ordinarily, such a combination of the $HfB_2$ layer 1502, individual electrodes 1504, and pattern wirings 1505*a* and 1505*b* (hereinafter called heat-generating element) is formed in a plural number in the recording unit 1 as shown in FIG. 19 (*a*). Thus, by providing a plural number of heat-generating elements on the recording element unit of 1, an ink jet recording device capable of performing simultaneous recording of a plurality of dots is obtained, thereby rendering it feasible to effect a higher speed of recording. Particularly, in these days when the demands for higher density and higher speed recording are high, simultaneous recording of one main scanning line has been generalized, and therefore, recording element units having a large number of heat generating elements at high density are appearing.

In the case of performing simultaneous recording of a plurality of dots by arranging a plurality of heat generating elements on one recording element unit, the turning of the heat-generating elements on and off must be controlled individually for the respective heat-generating elements. The means for performing such control (hereinafter called the driving element) can be also formed within the recording element unit, but is generally formed on an independent substrate (hereinafter, this substrate is called the driving element substrate), and is connected to the recording element unit. This is because, when the recording element and the driving element are formed integrally, there is the problem that if a defect occurs in a part of either of the recording element or the driving element, the whole device will fail to be actuated.

In the prior art, as the technique for bonding electrically the recording element substrate and the driving element substrate, the following techniques have been known in the prior art.

(1) The wire bonding method

The wire bonding method is a method, as shown in FIG. 20, in which the electrode 1614, 1615 of the recording element substrate 1604 is electrically connected to a desired electrode of the driving element substrate by use of an extremely fine metal wire 1616 composed, for example, of gold, etc.

(2) The method using an electrical connecting member.

This is a method in which the electrode portion of the recording element substrate is connected to the electrode portion of the driving element substrate by use of the electrical connecting member disclosed in Japanese Patent Application No. 63-133395.

FIGS. 21A to 21C are diagrams for illustration of this method. In the Figures, 1704 is a recording element substrate, 1705 is a driving element substrate, 1714 and 1715 are electrode portions, 1719 and 1720 are insulating films. 1703 is an electrical connecting member, 1717 is an electroconductive member, and 1718 is a holding member for holding the electroconductive member 1717. Here, the pitch of the electroconductive member 1717 is set narrower than the pitch of the electrodes of 1714 and 1715.

The recording element substrate 1704, the driving element substrate 1705 and the electrical connecting member 1703 are first arranged as shown in FIG. 21A, and then pressure contacted with each other as shown in FIG. 21B. FIG. 21C shows the whole view after pressure contact.

However, the electrical connecting methods of the prior art as described above have the following disadvantages.

(1) Wire bonding method:

(a) In the wire bonding method, for avoiding mutual contact between the adjacent very fine metal wires, the pitch dimension of the connecting portion on the recording element substrate or on the driving element on the driving element substrate (distance between the centers of the adjacent connecting portions) must have a certain interval. Accordingly, once the sizes of the recording element substrate and the driving element substrate are determined, the maximum number of the connecting portions will be necessarily determined. Whereas, according to the wire bonding method, the pitch dimension is generally as large as about 0.2 mm, and therefore the number of the connecting portions cannot but be small.

This means that when the number of the connecting portions of the recording element substrate or the driving element substrate is determined, the sizes of the recording element substrate and the driving element substrate must be made extremely long.

(b) The height h of the very fine metal wire measured from the connecting portion on the driving element is generally 0.2 to 0.4 mm, but since it is difficult to make the thickness thinner than 0.2 mm, no thinning can be effected.

(c) It takes a long time for wire bonding working. Particularly, when the connecting point numbers are increased, the bonding times becomes longer thereby reducing production efficiency.

(d) If the transfer mold conditions range is surpassed by some factors, the very fine metal wire may be deformed or even cut in the worst case.

Also, at the connecting portion on the driving element, Al corrosion is liable to occur because Al not forming an alloy with the very fine metal wire is exposed, whereby reliability is reduced.

(e) When the driving element becomes defective, it is difficult to change only the driving element.

(2) The method using the electrical connecting member.

This method has the advantages that the unit can be miniaturized, no highly precise registration is required, and the cost can be reduced, etc., but further miniaturization and cost reduction are demanded.

SUMMARY OF THE INVENTION

An object of the present invention is to provide a recording element unit comprising: a support member; a recording element provided on the suppport member and having a wiring layer for supplying electrical signals; and a bump-shaped electrode connected to the end of said wiring so as to be raised therefrom.

Another object of the present invention is to provide a recording element driving unit comprising: a recording element unit having a support member, a recording element provided on the support member and having a wiring layer for supplying electrical signals and a bump-shaped electrode connected to the end of the wiring layer so as to be raised therefrom; and a driving element substrate having a driving element and a wiring connected to the driving element, the bump-shaped electrode being connected to the wiring of the driving element substrate.

Still another object of the present invention is to provide an ink jet unit comprising: a support member; a recording element provided on the support member and having a wiring layer for supplying electrical signals; a bump-shaped electrode connected to the end of the wiring so as to be raised therefrom; and a liquid channel communicating with the discharging opening for discharging ink provided corresponding to the energy generating portion of the recording element.

Still another object of the present invention is to provide an ink jet driving unit comprising: a recording element unit having a support member, a recording element provided on the support member and having a wiring layer for supplying electrical signals and a bump-shaped electrode connected to the end of the wiring layer so as to be raised therefrom; and a driving element substrate having a driving element and a wiring connected to the driving element, the bump-shaped electrode being connected to the wiring of the driving element substrate; and a liquid channel communicating with the discharging opening for discharging ink being provided corresponding to the energy generating portion of the recording element.

Yet another embodiment of the present invention is to provide an ink jet recording apparatus that includes an ink jet driving unit comprising a recording element unit that includes a support member, a recording element provided on the support member, and a bump-shaped electrode. The recording element has a wiring layer for supplying electrical signals, a first insulating section provided above the wiring layer, with the first insulating section including at least one insulating layer, and a second insulating section provided above the first insulating section. The second insulating section has a thickness greater than that of the first insulating section for providing structural strength to the support member to prevent the support member from warping. The bump-shaped electrode is connected to the wiring layer through a plurality of openings in the first and second insulating sections so as to be raised from the wiring layer. The bump-shaped electrode includes a plurality of raised portions provided through the openings in the first and second insulating sections, with each raised portion corresponding to one of the openings.

A further object of the present invention is to provide an ink jet recording device comprising a member for mounting the ink jet driving unit.

DETAILED DESCRIPTION OF THE INVENTION

Figure 1:
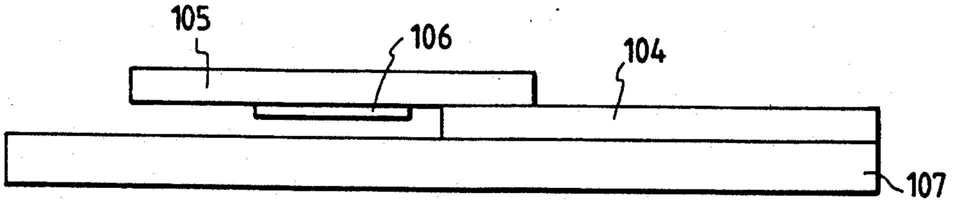
FIG. 1 is a schematic sectional view showing the state in which the recording element substrate is bonded to the driving element substrate.

The present invention is described in detail below with respect to its constitution.

Below, some of the elements of the present invention are described with respect to the embodiments shown in FIGS. 1, 4, 5, 7, 8, 11, and 13. The specific reference numerals associated with each element described below represent one specific embodiment of the element. Each element can be exemplied by a number of different embodiments, discussed in more detail in Examples 1-7.

Recording element, Driving element

Figure 7:
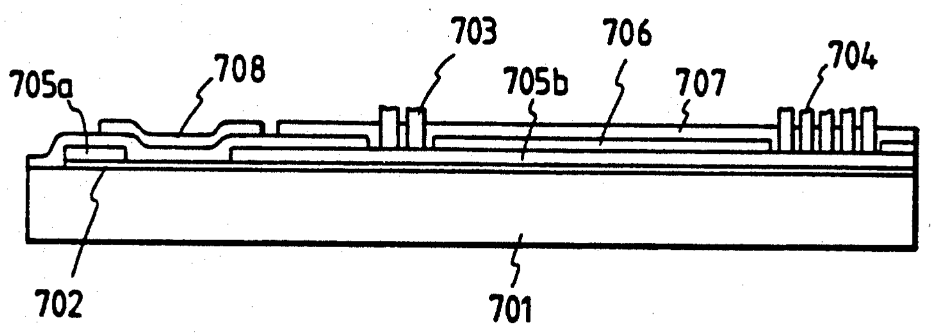
FIG. 7 is a schematic sectional view showing the recording element unit according to a third example of the present invention.

As the recording element in the present invention, for example, an electricity-heat converter 702 shown in FIG. 7 which generates heat energy (heat-generating element) and other recording elements such as piezoelectric element may be employed.

Pattern wiring and bump-shaped electrode

The pattern wiring 705*a*, 705*b* shown in FIG. 7 of the recording element substrate 104 shown in FIG. 1 (recording element unit) and the driving element substrate 105 shown in FIG. 1 is formed on the surface of the holding member 701 shown in FIG. 7. Also, when a protective film 706 shown in FIG. 7 is formed on the surface of the holding member 701 for protection and insulation of the pattern wiring 705*a*, 705*b*, a pattern wiring with a sufficient area for formation of a bump-shaped electrode 703, 704 shown in FIG. 7 may be exposed.

The pattern wiring 705*a*, 705*b* may be formed of, for example, an electroconductive material such as Al, etc.

For the pattern wiring 705*a*, 705*b* of the recording element substrate 104 (recording element unit), a bonding portion comprising a bump-shaped electrode 703, 704 is formed.

The bump-shaped electrode 703, 704 may be formed only one or in a plural number per one bonding portion. On the other hand, no bump-shaped electrode is required to be formed on the pattern wiring 705*a*, 705*b* of the driving element substrate 105. The bonding portion comprising a bump-shaped electrode 703, 704 is provided for effecting electrical connection to another circuit substrate (e.g. driving element substrate). That is, electrical connection is effected by bonding directly to the bonding portion of another circuit substrate.

The bump-shaped electrode 703, 704 may be made of the same material as the pattern wiring 705*a*, 705*b* or a material different therefrom. As the material for forming the bump-shaped electrode 703, 704, for example, metals such as Cu, Ni, Au, Cr, Rh, etc., or alloys comprising combinations of these may be available. Also, the bump-shaped electrode 703, 704 and the pattern wiring 705*a*, 705*b* may be formed integrally formed from the beginning, or alternatively the pattern wiring 705*a*, 705*b* may be formed first and then the bump-shaped electrode 703, 704 are formed thereon. When the bump-shaped electrode 703, 704 is formed after formation of the pattern wiring 705*a*, 705*b* for the reason as described below, it should be desirably formed according to the electroplating method with said pattern wiring 705*a*, 705*b* as the electrode. Also, in this case, the pattern wiring 705*a*, 705*b* should be desirably formed of Cu.

In the present invention, for the reason as described below, the pattern wiring 705*a*, 705*b* which becomes the common electrode can be also provided on the driving element substrate 105, rather than on the recording element substrate 114.

In the recording element substrate 104, (recording element unit) in the present invention, it is desirable to provide recording elements and the pattern wirings corresponding to the recording elements in a number more by one or more than the necessary number. By doing so, bonding between the bonding portion of the recording element substrate 104 and the pattern wiring of the driving element substrate 105 can be effected without requiring strict registration. Also, for the same reason, it is desirable to provide driving elements 106 shown in FIG. 1 and pattern wirings 705*a*, 705*b* of driving element substrate 105 in numbers more than one or more than the necessary number.

Protective layer

In the recording element substrate 104 (recording element unit) of the present invention, for protection and insulation of the pattern wiring 705*a*, 705*b* a protective layer 706 should desirably be formed on the surface of the holding member 701. As the protective layer, there may be included, for example, an oxidation resistant protective layer 706 formed of $SiO_2$, a protective layer 708 shown in FIG. 7 for cavitation resistance formed of Ta, an ink resistance protective layer 707 shown in FIG. 7 formed of a photosensitive polyimide, etc. The protective layer may be one layer, or two or more layers may be also provided depending on the purpose.

Insulating layer and insulating film

In the recording element substrate 104 (recording element unit) of the present invention, for the reason as described below, it is desirable to further provide an insulating layer 1109 shown in FIG. 11 on the protective layer. As the material for formation of the insulating layer 1109 shown in FIG. 11, there may be employed phenol resin, melanine resin, polyester resin, silicone resin, epoxy resin, vinyl chloride resin, styrol resin, acrylic resin, polyimide resin, phenol resin, polycarbonate resin, polypropylene, urea resin, etc. Since the present invention is intended to eliminate the influence from curving or unevenness of the surface of the unit by providing the insulating layer 1109 as described below, the thickness of the layer should be preferably as thick as possible.

Figure 13:
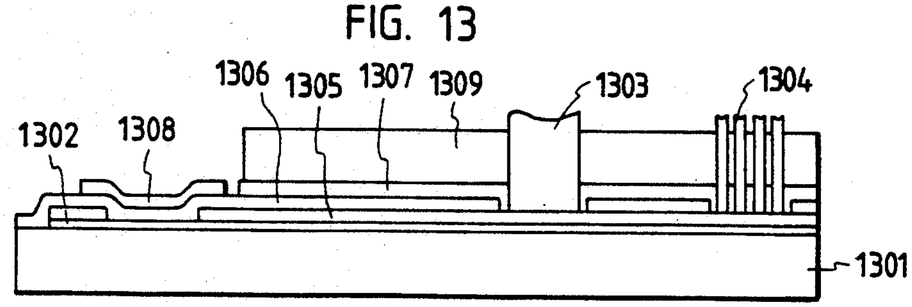
FIG. 13 is a schematic sectional view showing the recording element unit according to a sixth example of the present invention.

Also, in place of forming an insulating layer 1109, an insulating film 1309 shown in FIG. 13 may be also provided on the protective layer.

As the material for forming the insulating film 1309 shown in FIG. 13 of the present invention, similarly as in the case of insulating layer 1109, there can be employed phenol resin, melanine resin, polyester resin, silicone resin, epoxy resin, vinyl chloride resin, styrol resin, acrylic resin, polyimide resin phenol resin, polycarbonate resin, polypropylene, urea resin, etc.

The insulating film 1309 shown in FIG. 13 has a thruhole, and the bump-shaped electrode 1303, 1304 shown in FIG. 13 is exposed from the surface therethrough. The position, size and number of thruholes are not particularly limited. For example, it is not required to be positioned only at the electrode forming portion, may be also present on other portions without giving any influence. Also, one thruhole may be formed corresponding to one bump-shaped electrode 1303, 1304 shown in FIG. 13, or alternatively a large number of thruholes may be also formed at around the bonding portion as shown in FIGS. 14F and 14G described below. When a large number of thruholes are formed at around the bonding portion, there is the advantage that no strict precision in pitch in forming the insulating film or no strict precision in registration during plastering the insulating film 1309 is required (or no registration may be required).

Since the present invention is intended to eliminate the influence from curving or unevenness of the surface of the unit by providing the insulating film 1309 as described below, the thickness of the film should be preferably as thick as possible.

Bonding

Bonding is practiced as shown in FIG. 1. In the FIG. 104 is a recording element substrate, 105 is a driving element substrate, 106 is a driving element and 107 is a base stand. The surface of the driving element substrate on which the driving element is provided and the surface having the bonding portion are not required to be the same, but may be the opposite surfaces.

Bonding method

The present invention exhibits particularly its effect when the bonding portion of the recording element substrate 104 (recording element unit) and the bonding portion of the driving element substrate 105 are bonded according to the pressure bonding method. Also, bonding by way of metallization and/or alloy formation, or other methods than metallization and/or alloy formation may be feasible, and these methods may be also used in combination with the pressure bonding method.

In the following, bonding by way of metallization and/or alloy formation, and bonding according to other methods than metallization and/or alloy formation are to be described.

(1) Bonding by way of metallization and/or alloy formation.

When the bump-shaped electrode 703–704 of the recording element substrate 104 and the pattern wiring of the driving element substrate 105 (of the pattern wiring, the portion to be bonded to the bump-shaped electrode 703–704 of the recording element substrate 104; hereinafter called merely as the bonding portion) to be bonded together comprise the same kind of pure metal, the layer formed by metallization has the same kind of crystalline structure as the bump-shaped electrode 703–704 of the recording element substrate or the pattern wiring of the driving element substrate 105. As the method for metallization, for example, after bringing the bump-shaped electrode 703–704 of the recording element substrate in contact with the bonding portion of the driving element substrate 105 corresponding to said bump-shaped electrode 703, 704, the contact portions may be heated to a suitable temperature. In this case, diffusion of atoms, etc. occur in the vicinity of the contacted portions by heating, and the diffusion portions become metallized to form a metal layer.

When the bump-shaped electrode 703, 704 of the recording element substrate 104 and the bonding portion of the driving element substrate 105 to be bonded together comprise different kinds of pure metals, the bonding layer to be formed becomes an alloy of the both metals. As the method for alloy formation, similarly as described above, for example, after the bump-shaped electrode 703, 704 of the recording element substrate 104 is brought into contact with the bonding portion of the driving element substrate 105 corresponding to said bump-shaped electrode 703, 704, the contacted portions may be heated to a suitable temperature. In this case, diffusion of atoms, etc. occur in the vicinity of the contacted portions by heating, whereby an alloy layer comprising a solid solution or an intermetallic compound will be formed in the vicinity of the contacted portions.

The heating temperature may be preferably made 200° to 350° C. when, for example, the bonding portion (bump-shaped electrode) of the recording element substrate 104 is formed of Au, and the bonding portion of the driving element unit is formed of Al.

When one of the bump-shaped electrode 703, 704 of the recording element substrate 104 and the bonding portion of the driving element substrate 105 to be bonded together comprises a pure metal and the other comprises an alloy, or both comprise the same kind or different kinds of alloys, the bonding interface comprises an alloy layer.

With regard to mutual bump-shaped electrodes 703, 704 of the recording element substrate, there may be included the case when the respective bump-shaped electrodes 703, 704 comprise the same kind of metal or alloy, the case when the respective electrodes different kinds of metals or alloys and other cases, but in any case, the above metallization or alloy formation as described above is effected. On the other hand, the same is the case with the bonding portion of the driving element substrate 105.

The bump-shaped electrode 703, 704 of the recording 104 element substrate or bonding portion of the driving element substrate 105 may be a metal or an alloy at the contacted portions of the both, and may be also under the state of, for example, a metal formulated with an inorganic material such as glass, etc. or a metal formulated with an organic material such as resin, etc.

Also, on the surface to be bonded, there may be also provided a plated layer comprising a metal readily formed into an alloy or an alloy.

As the heating method, other than the method such as heat pressurization adhesion, etc., there may be also employed the internal heating methods such as the sonication heating method, the high frequency induction heating method, the high frequency dielectric heating method, the microwave heating method, etc. or other external heating methods, and the above heating methods may be also used in combination. In any of the heating methods, the bonding portions of the driving element substrates 105 are heated directly or indirectly to effect bonding. (Bonding according to methods other than metallization and/or alloy formation)

For effecting bonding according to methods other than the above metallization or alloy formation, for example, bonding may be effected by pressing the bonding portion of the driving element substrate 105 against the bump-shaped electrode 703, 704 of the recording element substrate 104 by a suitable means.

As other bonding methods, there may be included that bonding method by use of an adhesive, etc. That is, there are the methods in which bonding is effected by adhering the recording element substrate 104 to the bump-shaped electrode 703, 704 of the recording element substrate 104 at least a part excluding the bonding portion of the driving element substrate 105.

As for bonding between the recording element substrate 104 and the driving element substrate 105 bonding should be preferably effected freely detachably.

Respective units

The recording element driving unit in the present invention is a unit which drives the recording elements formed in the recording element unit following the image signals inputted externally. The recording element driving unit comprises the above driving element substrate 105 and the recording element substrate 104 (recording element unit).

Figure 4:
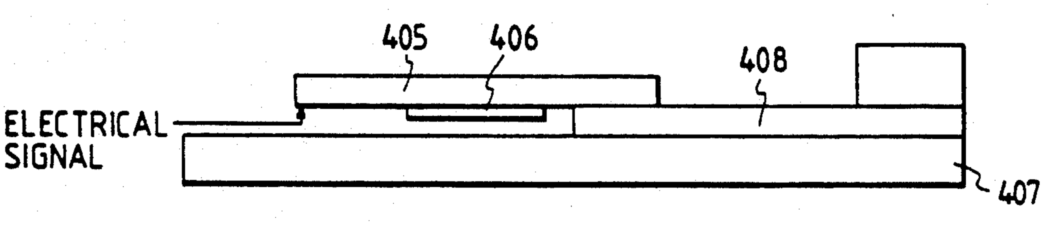
FIG. 4 is a schematic sectional view showing an example of the ink jet unit and the ink jet driving unit according to the present invention.

The ink jet unit 408 shown in FIG. 4 has a liquid channel communicating with a discharging opening for discharging ink formed on the recording element substrate 104 (recording element unit), which performs discharging of ink by permitting the energy of the recording element to act on ink. The shape, dimensions, etc. of the liquid channel may be any desired ones.

The ink jet driving unit is a unit for discharging ink through the discharging opening following the image signals inputted externally, and comprises an ink jet unit and a driving element substrate 405 shown in FIG. 4.

Ink jet recording device

Figure 5:
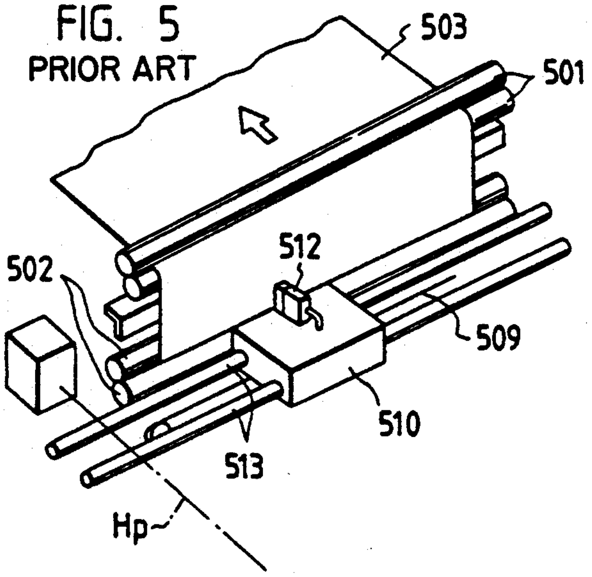
FIG. 5 PRIOR ART
FIG. 5 is a perspective view showing an example of the principal part of the serial scanning type ink jet recording device according to the present invention.
Figure 6:
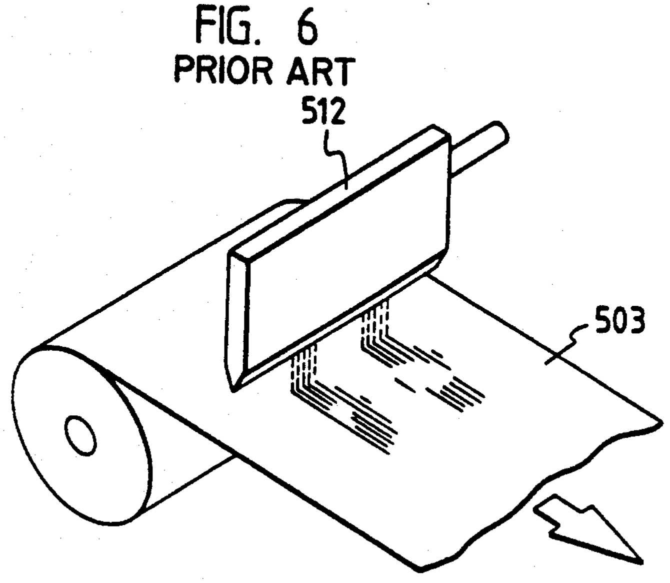
FIG. 6 PRIOR ART
FIG. 6 is a perspective view showing an example of the principal part of the planar scanning type ink jet recording device according to the present invention.

The ink jet recording device in the present invention is a device which performs recording by discharging ink through a discharging opening following the image signals inputted externally, and attaching the ink onto a recording paper. This ink jet recording device has at least the above ink jet driving unit and a means for mounting the ink jet driving unit. As the type of the ink jet recording device, there are the so called serial scanning type (printing is effected while the print head moves in a reciprocal fashion in the lateral direction relative to the paper) and the full line type (recording of one main scanning line is effected at the same time by use of a print head with one main scanning line width). FIG. 5 and FIG. 6 show an example of the principal portions of the ink jet recording device of the present invention. FIG. 5 shows the serial scanning type and FIG. 6 the full line type. In FIG. 5, 12 is the ink jet driving unit.

The present invention exhibits the effect particularly in a lengthy ink jet driving unit 12 and therefore it is preferable to employ the full line type.

Mode of operation (1) In the present invention, since a bump-shaped electrode 703, 704 is provided at the connecting portion of the recording element substrate 104 (recording element unit), an electrical connection of high reliability can be effected by bonding directly the recording element substrate 104 and driving element substrate 105.

Accordingly, it has become possible to permit the bonding portions of the recording element substrate and the driving element substrate to exist at a high density, whereby higher densification becomes possible.

Further, even in a lengthy unit, miniaturization becomes possible.

Also, since no additional part is required for electrical connection at all, it becomes possible to make thinner the thickness of the unit and to reduce the cost thereof.

Further, because the amount of the metal members used for the bump-shaped electrode of the recording element substrate 104 is small, even if an expensive metal member is employed, a reduction in cost becomes possible.

In addition, by arranging the recording elements and the pattern wirings corresponding to the recording elements in numbers of more than one or more than the necessary number, or further providing the driving elements or pattern wirings of the driving element substrate in numbers more than one or more than the necessary number, even in the case of a lengthy device, it becomes possible to effect bonding between the recording element substrate 104 and the driving element substrate 105 without performing registration, or without performing high precision registration, if any.

Particularly, when a bubble ink jet system is used as the ink jet recording system, registration can be performed with difficulty because wiring of higher density is required. However, according to the present invention, even in the case of such high density wiring, registration can be done with extreme ease.

Further, in the present invention, since the recording element substrate 104 and the driving element substrate 105 can be bonded together freely detachably, the driving element substrate 105 can be easily separated, and hence is also exchanged easily.

(2) In the present invention, without the formation of a common electrode on the recording element unit, respective individual pattern wirings 705*a* or 705*b* are formed, bonding portions are formed on these pattern wirings, and further, a pattern wiring 705*a*, 705*b* which becomes the common electrode on the driving element substrate side with a higher degree of freedom of designing and the bonding portion of the pattern wiring on the recording element unit side is bonded to the common electrode. With such a constitution, further miniaturization of the recording element unit or the recording element driving unit can be effected.

Since a large current flows through the common electrode, a large size to some extent (thickness and width) is required for suppressing small resistance, and also since the size of the common electrode becomes greater as the number of the recording elements becomes larger, the size of the common electrode is not negligible in a recording element unit of lengthy and high density wiring. However, by forming a common electrode on the driving element substrate side by and effecting bonding of the bonding portion of the common electrode to the bonding portion on the recording element unit side, it becomes possible to miniaturize to great extent the recording element unit and the recording element driving unit, the ink jet unit, the ink jet driving unit and the ink jet device by use thereof.

Particularly, when the ink jet is a bubble ink jet, such a constitution is very effective, because wiring of higher density is demanded.

When the bonding method of the prior art, for example, wire bonding is employed, it has been substantially impossible to form a wiring pattern which becomes the common electrode on the driving element substrate side and to electrically connect the individual pattern wirings formed on the recording element substrate to the pattern wiring of the common electrode. Because reliability of the bonding portion is lower than in the case of the present invention, if the number of the connecting portions is increased excessively, there is the problem that the reliability of the unit as a whole is lowered or the recording element driving unit, etc. is enlarged as the number of the connection portions is creased. In contrast, in the present invention since a connecting portion having a bump-shaped electrode 703, 704 is provided, even in the case when a pattern wiring which becomes the common electrode is provided on the driving element substrate side, the reliability of bonding between the above individual pattern wirings and the pattern wiring of the common electrode will not be lowered as a whole and the recording element driving unit, etc. will not be enlarged.

(3) In the present invention, the electrode in forming the bump-shaped electrode 703, 704 of the recording element unit bonding portion, due to the use of pattern wirings of the recording element unit 104, in the steps of preparing the bump-shaped electrode 703, 704, does not require that at subbing layer be formed, which should become the electrode generally employed in the electroplating method. As a result, the preparation steps can be simplified, and the material for forming the electroplated subbing layer becomes unnecessary, whereby the material cost can be reduced. Particularly, in a lengthy recording element substrate 105 (recording element unit), a large amount of material for forming the electroplated subbing layer is required in the prior art method, and therefore the present invention is very effective.

Also, when electroplating is effected with the use of the pattern wiring 705*a*, 705*b* as the electrode, a bump-shaped electrode 703, 704 with a convex sectional shape at the tip end can be formed and therefore the contact resistance during pressure contact can be made lower. When an electroplated subbing layer is used as the electrode, the sectional shape of the tip end of the bump-shaped electrode 703, 704 becomes concave. Even if the sectional shape of the tip end of the bump-shaped electrode may be concave, the contact resistance during pressure contact is practically within a sufficiently permissible range. However, according to the investigations by the present inventors, contact resistance can be made even smaller when the shape is convex rather than concave.

In other words, electroplating by use of the pattern wiring as the electrode is very desirable, because a recording element substrate 104 (recording element unit) capable of ensuring electrical connection with smaller contact resistance than in the case of forming an electrode by formation of an electroplated subbing layer can be obtained more inexpensively than in the case of forming an electrode by formation of an electroplated subbing layer.

(4) In the present invention, by providing newly an insulating layer 1109 or an insulating film 1309 on the protective layer 706–708 of the recording element substrate 105 of the prior art, a bump-shaped electrode 703, 704 with long foot length can be formed as the bump-shaped electrode 703, 704 forming the connecting portion of said recording element substrate 104, whereby variance in the position of the tip end of the above bump-shaped electrode 703, 704 caused by curving or unevenness of the surface of said recording element substrate 104 during pressure contact of the connecting portion of said recording element substrate 104 and the connecting portion of the driving element substrate 105 can be absorbed to further improve the reliability of the electrical connection between said recording element substrate 104 and the driving element substrate 105.

The reason is described in detail below.

The recording element substrate 104 and the driving element substrate 105 should most desirably completely flat plate without curving or unevenness. For, bonding can be effected easily and therefore reliability of the electrical connection can be obtained with ease.

However, electrical circuit substrates are not generally flat plates, but they rather curve or are uneven. Also, curving may be sometimes generated by heat generation during driving. When a substrate with large curving or unevenness is employed, there is a fear that a defective connection may occur at the electrical connection between the recording element substrate 104 and the driving element substrate 105. For prevention of a defective connection, it is necessary to make the connection firm or employ a substrate with no curving or unevenness (or difficultly curved), but such a method has the problem of inviting an increased cost.

The present invention improves the reliability of electrical connection to a greater extent than in the prior art, and the influence from curving and unevenness is small as compared with the prior art. Accordingly, there ensues generally no such problem. However, while the influence from curving becomes greater as the recording element unit is longer in the length direction, the recording element unit of the present invention can exhibit its advantage as the length in the length direction is longer and therefore, in view of the possibility of demand of enlargement of the recording paper size in the future, it may be considered necessary to have a technique to remove the influence from curving of the substrate, etc.

The present inventors have investigated this problem intensively and consequently developed the idea that the problem may be solved by forming a bump-shaped electrode 703, 704 through a layer with great film thickness for absorbing curving and unevenness of the substrate.

For that purpose, the present inventors first attempted to improve a defective connection by increasing the thickness of the protective layer 706, 708 layer such as oxidation resistant layer, ink resistant layer, etc. provided in the recording element substrate 104 of the prior art. However, according to such a method, no sufficient effect could be obtained. Accordingly, the present inventors have investigated the reason further and consequently have obtained the following facts.

(1) According to the investigations by the present inventors, curving or unevenness of the recording element substrate 104 is generally about some tens $\mu m$ to some hundreds $\mu m$. Also, according to the investigations by the present inventors, for absorbing such curving or unevenness sufficiently, a layer with at least a film thickness comparable to these curving and unevenness is required. However, it is substantially impossible to form a protective layer such as an oxidation resistant layer 706 to a film thickness of some hundreds $\mu m$. For example, since the oxidation resistant layer 706 is a protective film of a heat-generating member, if the film thickness is made greater, heat transmission efficiency will be lowered, and therefore the applied voltage is required to be made greater, but because the power resistance of the heat-generating resistance material is limited, it is difficult to make the thickness to a certain level or higher.

(2) Also, the present inventors have found that it is not preferable to absorb the curving or unevenness by increasing the thickness of the protective layer such as oxidation resistant layer 706 or the ink resistant layer 707, etc., also because the layer for absorbing curving or unevenness is different in the characteristic demanded from the oxidation resistant layer 706 or the ink resistant layer 707. The oxidation resistant layer 706 is required to have an oxygen barrier characteristic, thermal conductivity, heat resistance and no defect, etc. and for this purpose it may be preferably be formed of an inorganic material. On the other hand, the ink resistance layer 707 is required to have no defect, ink resistance (excellent adhesiveness in ink or difficult deterioration in ink), heat resistance, etc. In contrast, as the result of the investigations by the present inventors, the layer for absorbing curving or unevenness is required to have excellent insulation characteristics, flexibility, plating resistance, adhesiveness, etc., and a small thermal expansion coefficient and readiness for performing thicker film formation. According to the investigations by the present inventors, it is very difficult to form a layer having both the characteristics demanded for the layer for absorbing curving or unevenness and the characteristics demanded for oxidation resistant layer 706 or ink resistant layer 707.

For the above reasons, the present inventors have found that the protective layer of the prior art and the layer for absorbing curving or unevenness should be formed separately, and that it is preferable to provide a new insulating layer for absorbing curving or unevenness.

Also, the present inventors have made further investigations, and found that the influence from curving or unevenness on the substrate may be avoided by forming a new film by plastering an insulating film 1309 on the protective film 706–708 and by forming a bump-shaped electrode 703, 704 with long foot length by use of this. Further, the present inventors have investigated the method for performing the step of plastering an insulating film 1309 at a low cost, and consequently found that substantially no registration of the insulating film 1309 is required, by forming a large number of thruholes at the bonding portion of the insulating film 1309 and therearound.

EXAMPLE 1

Figure 19A:
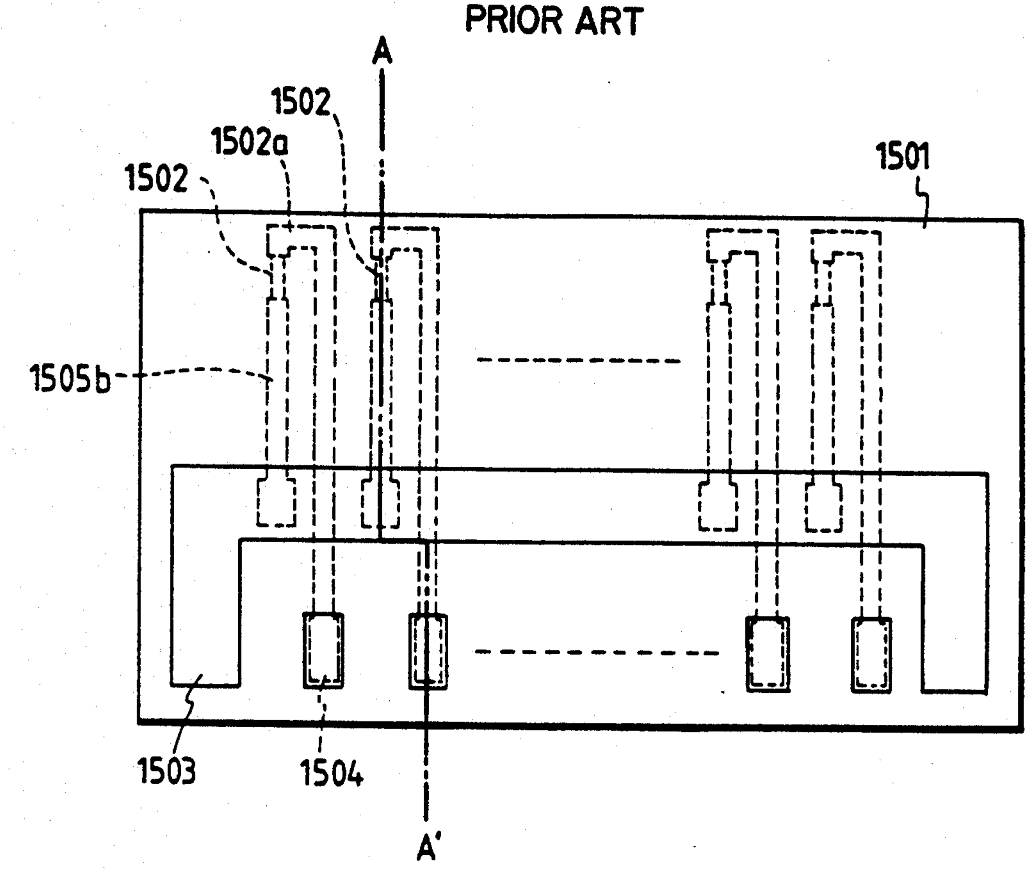
FIG. 19(a) PRIOR ART
FIG. 19(*a*) and FIG. 19(*b*) are schematic diagrams showing the recording element unit of the prior art, FIG. 19(*a*) representing a top view, and FIG. 19(*b*) representing a sectional view.
Figure 19B:
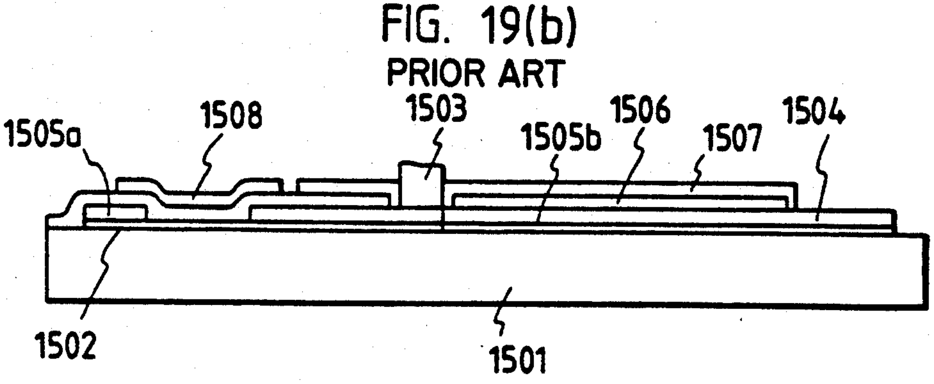
FIG. 19(b) PRIOR ART
Figure 20A:
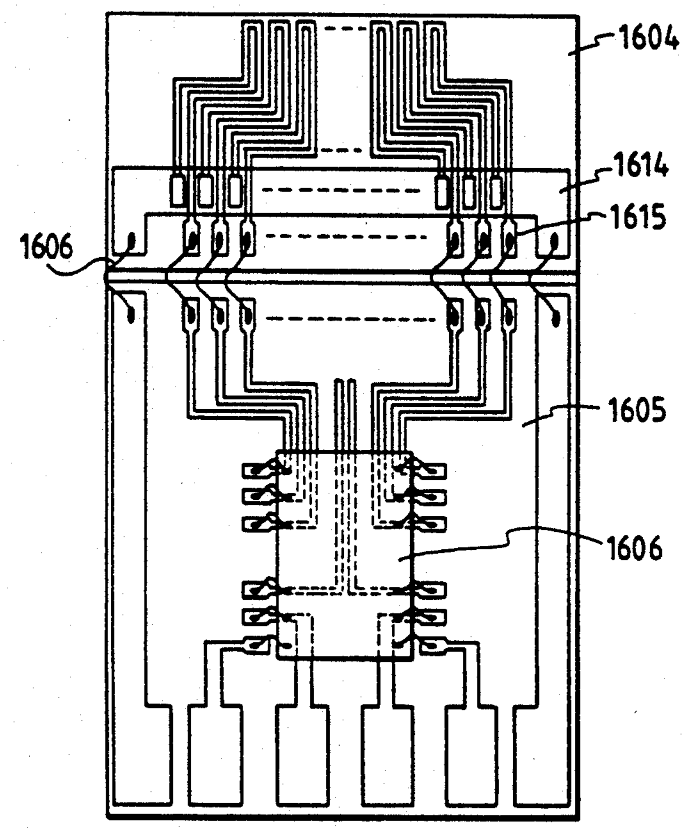
FIG. 20(a) PRIOR ART
FIG. 20(*a*) and FIG. 20(*b*) are diagrams for illustration of the connecting method according to the wire bonding method in the recording element driving unit of the prior art.
Figure 20B:
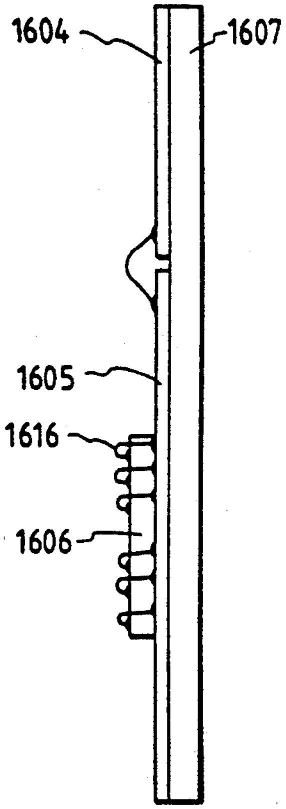
FIG. 20(b) PRIOR ART
Figure 21A:
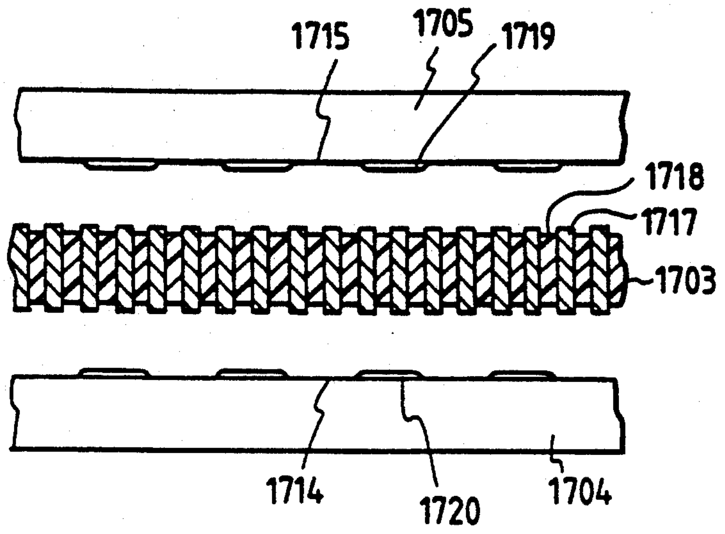
FIG. 21(a) PRIOR ART
FIGS. 21(*a*)-21(*c*) are diagrams for illustration of the bonding method by use of an electrical connecting member in the recording element driving unit of the prior art.
Figure 21B:
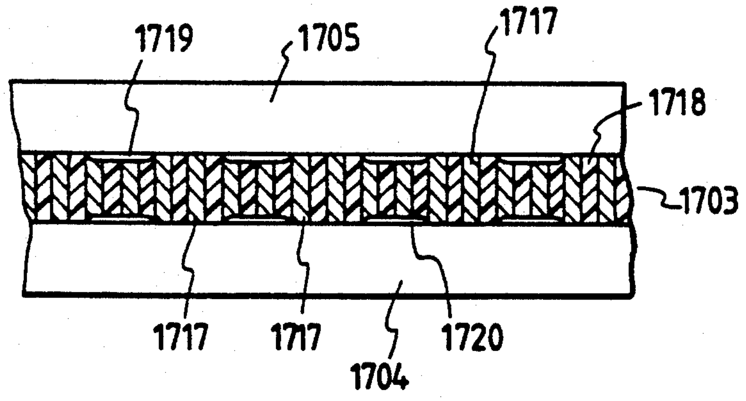
FIG. 21(b) PRIOR ART
Figure 21C:
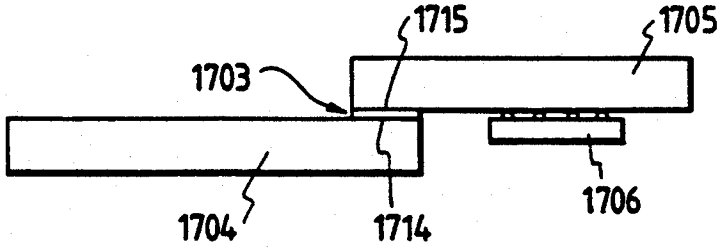
FIG. 21(c) PRIOR ART

As an example of the present invention, the recording element unit having substantially the same constitution as in FIG. 19 (*a*) and FIG. 19 (*b*), and having formed thereon a bump-shaped electrode for the individual electrodes 1504 is to be described.

The preparation steps of the recording element unit according to this Example are described below.

FIGS. 2A–2F are diagrams for illustration of an example of the preparation steps of the recording element unit according to the present invention.

Figure 2A:
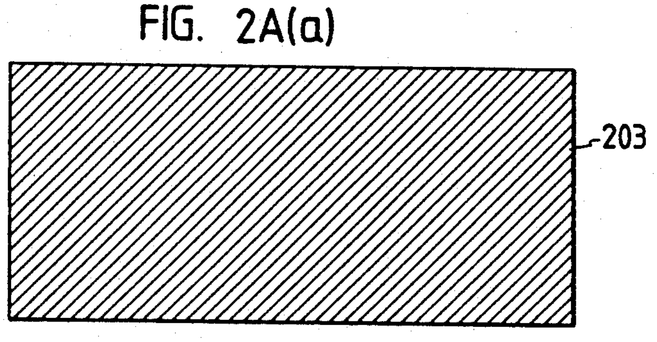
FIGS. 2A(*a*) to 2F(*c*) are schematic diagrams for illustration of the preparation steps of the recording element unit according to a first example of the present invention, (a) representing a top view and (b) and (c) representing sectional views, respectively.
Figure 2A:
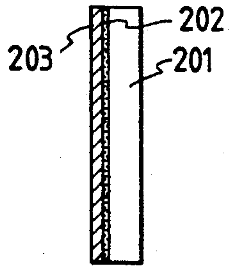

(1) First, an $HfB_2$ layer 202: 350 Å, Ti layer (omitted in FIG. 2A): 50 Å and Al layer 203: 6000 Å are formed on the whole substrate surface 201 according to the sputtering method (FIG. 2A).

(2) For formation of the wiring substrate, a resist is coated on the film formed in (1), then patterned by exposure and development by use of the photolithographic method, and further, $Al/Ti/HfB_2$ is etched to form a wiring. The resist is peeled off after etching.

Figure 2B:
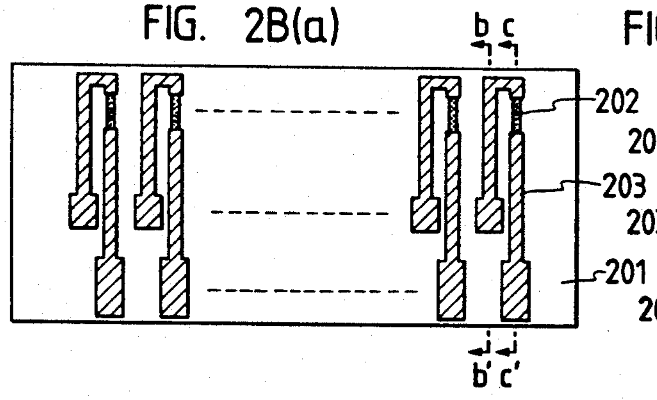
Figure 2B:
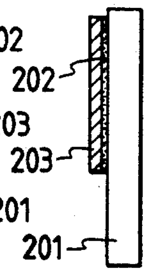
Figure 2B:
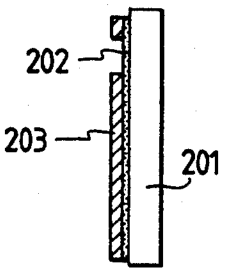

(3) On the $Al/Ti/HfB_2$ wiring electrode substrate formed in the above (2) is patterned a resist by use of the same photolithographic method as in (2) and further, Al is removed partially by etching to form a heater portion. The resist is peeled off after etching (FIG. 2B).

(4) $SiO_2$ layer 204: 9000 Å as the heater oxidation resistant layer and the interlayer insulating layer, $Ta_2O_5$ layer (omitted in FIG. 2C): 500 Å as the $SiO_2$-Ta adhering layer are Ta layer 205: 5000 Å as the cavitation resistant layer are formed on the whole substrate surface by continuous sputtering.

Figure 2C:
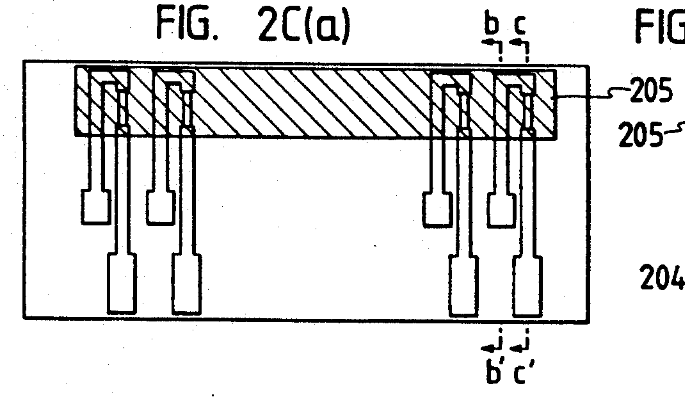
Figure 2C:
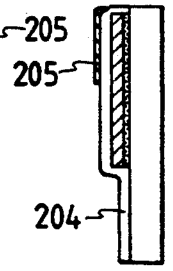
Figure 2C:
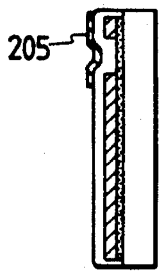

(5) According to the same method as in the above (2), the resist is patterned and Ta is removed partially by etching to form a Ta pattern. The resist is peeled off after etching (FIG. 2C).

Figure 2D:
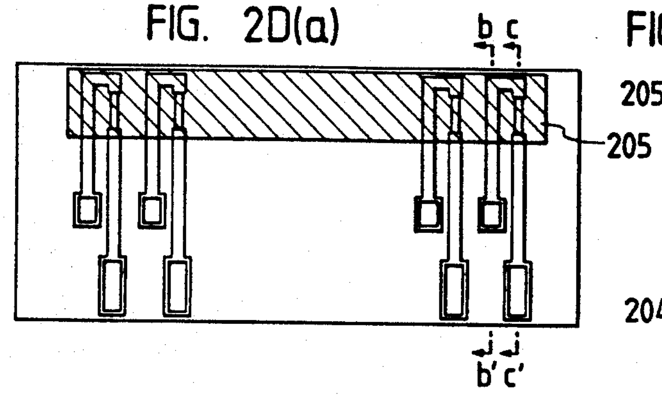
Figure 2D:
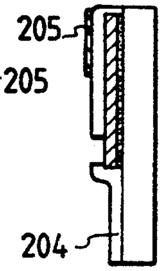
Figure 2D:
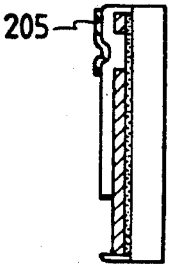

(6) According to the same method as in the above (2), resist was patterned and $SiO_2$ patterning is effected by removing partially $SiO_2$ by etching. The resist is peeled off after etching (FIG. 2D).

Figure 2E:
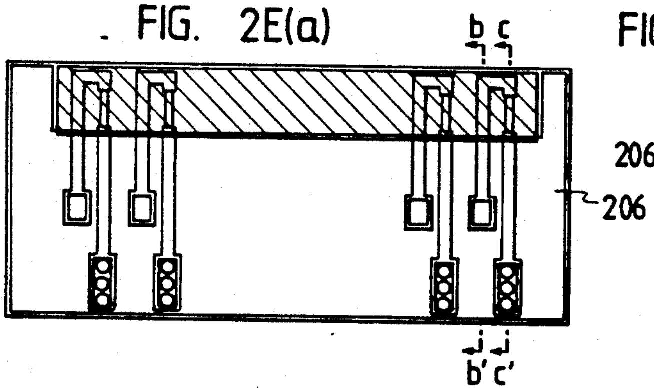
Figure 2E:
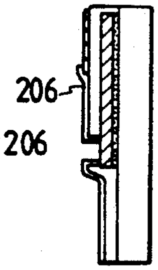
Figure 2E:
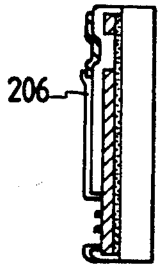

(7) An organic insulating film 206: 2.5 $\mu m$ as the ink resistant layer and the interlayer insulating layer is coated, and a pattern is formed according to the same method as in (2) or a pattern is formed by coating a photosensitive organic insulating film: 2.5 $\mu m$, followed by exposure and development (FIG. 2E).

(8) As the electroplated subbing layer (omitted in FIG. 2F), a Cu layer: 3000 Å and a Ti layer: 500 Å were formed on the whole substrate surface.

(9) A resist for formation of plating pattern is coated, exposed and developed.

Figure 2F:
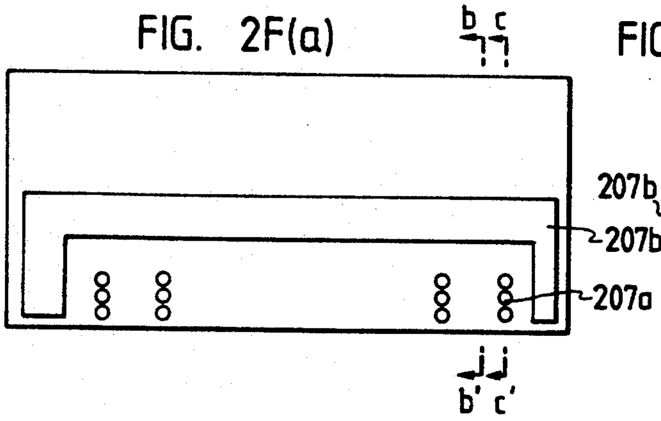
Figure 2F:
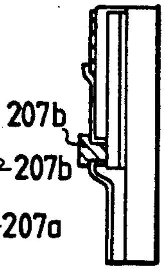
Figure 2F:
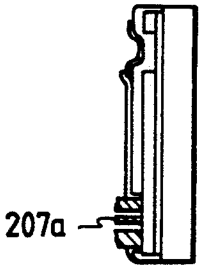

(10) According to the electroplating, a conductive raised portion 207*a*, 207*b* is formed with, for example, Cu, Ni, Au, Cr, Rh, etc. The film thickness is made several microns to some tens microns. Finally, the resist is peeled off (FIG. 2F).

An example of the preparation steps of this Example has been described above.

Figure 3:
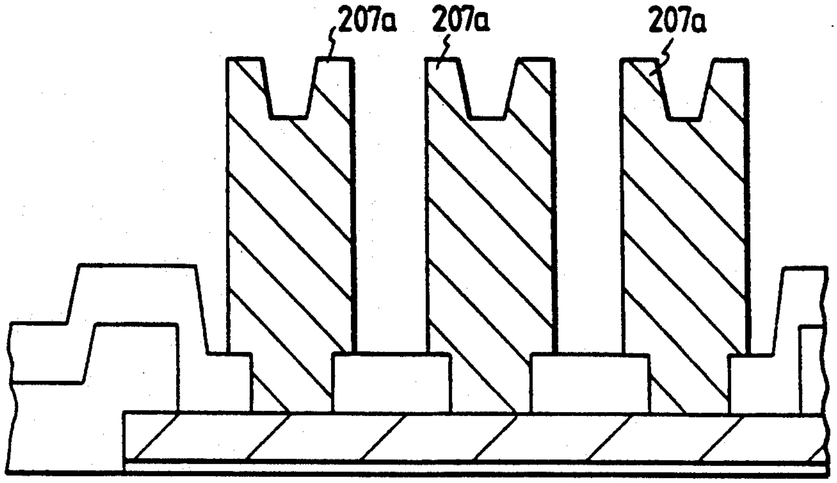
FIG. 3 is a schematic sectional view showing the bonding portion of the recording element unit according to the first example of the present invention.

In this Example, the raised portion 207*a* prepared in the above (10) becomes the bonding portion. FIG. 3 shows an enlarged view of this portion. By bonding this portion to the bonding portion of another substrate as shown in FIG. 1, electrical connection to another circuit substrate (e.g. driving element substrate) can be effected.

Thus, according to this Example, merely by bonding to another circuit substrate such as a driving element substrate, etc., an electrical connection of high reliability between substrates can be effected.

EXAMPLE 2

In the above Example 1, the recording element unit according to an example of the present invention was described. Here, examples of the recording element driving unit, the ink jet unit, the ink jet driving unit and the ink jet device according to the present invention are described respectively.

The recording element driving unit according to this Example is formed by connecting a driving element substrate to the recording element unit prepared as described in the above Example 1, and takes a constitution as shown in FIG. 1. In Figure, 104 is a recording element substrate (namely the recording element unit according to Example 1), 105 is a driving element substrate and 106 is a driving element.

Next, the ink jet unit and the ink jet driving unit according to this Example are described. The ink jet unit according to this Example has a liquid channel communicating with a discharging opening formed on the recording element unit prepared as described in the above Example 1, and also the ink jet driving unit has a driving element substrate connected to the ink jet unit. FIG. 4 shows an example of the ink jet unit and the ink jet driving unit according to this Example. In FIG. 4, 408 is the ink jet unit according to the present invention, 405 is a driving element substrate and 406 is a driving element.

Finally, the ink jet recording device according to this Example is to be described. FIG. 5 is a diagram showing an example of the ink jet recording device according to the present invention. In FIG. 5, the recording sheet 503 is conveyed by a paper feeding roller (not shown) to the sheet delivery rollers 501, 502 placed as keeping a predetermined interval vertically and the sheet is delivered in the arrowhead A direction.

There is also provided a carriage 510 which moves along the guide axis 513 in front of the above recording sheet 503. On the carriage 510 is mounted an ink jet driving unit 512 as described above.

The above carriage 510 is driven in a reciprocal fashion through the belt transmission mechanism 509 by a carriage driving motor (not shown).

During recording, as synchronized with the recording sheet 503 width direction driving of the above carriage 510, recording is effected while discharging ink as droplets from the discharge opening of the above ink jet driving unit toward the recording sheet 503. In the ink jet driving unit is formed a discharging opening directed toward the recording sheet 503 side, and ink droplets fly from the discharging opening corresponding to the signals from the driving element.

FIG. 6 shows another example of the ink jet recording device of the present invention. The difference between this example and the above ink jet recording device is that the ink jet driving unit 512 of this example has recording elements corresponding to the recording width of the recording paper. Accordingly, no reciprocal driving of the carriage is required, and therefore the mechanism can be simple and also high speed recording is possible. In this example, since a very long unit is used, the efficiency of practicing the present invention is enormous.

EXAMPLE 3

As a third example of the present invention, the case of providing no common electrode on the recording element unit is described.

FIG. 7 is a schematic sectional view showing the recording element unit according to this Example. In FIG. 7, 701 is a holding member, 702 is a $HfB_2$ layer as the heat-generating resistance layer, 703 and 704 are individual electrodes of Al, 705*a* and 705*b* pattern wirings of Al, 706 is a $SiO_2$ layer as the oxidation resistant layer and the insulating layer, 707 is a photosensitive polyimide layer as the ink resistant layer and the insulating layer, and 708 is a Ta layer as the cavitation resistant layer.

Next, an example of the preparation steps of the recording element unit according this Example is described by referring to FIGS. 8A–8G.

Figures 8A, 8B, 8C, 8D:
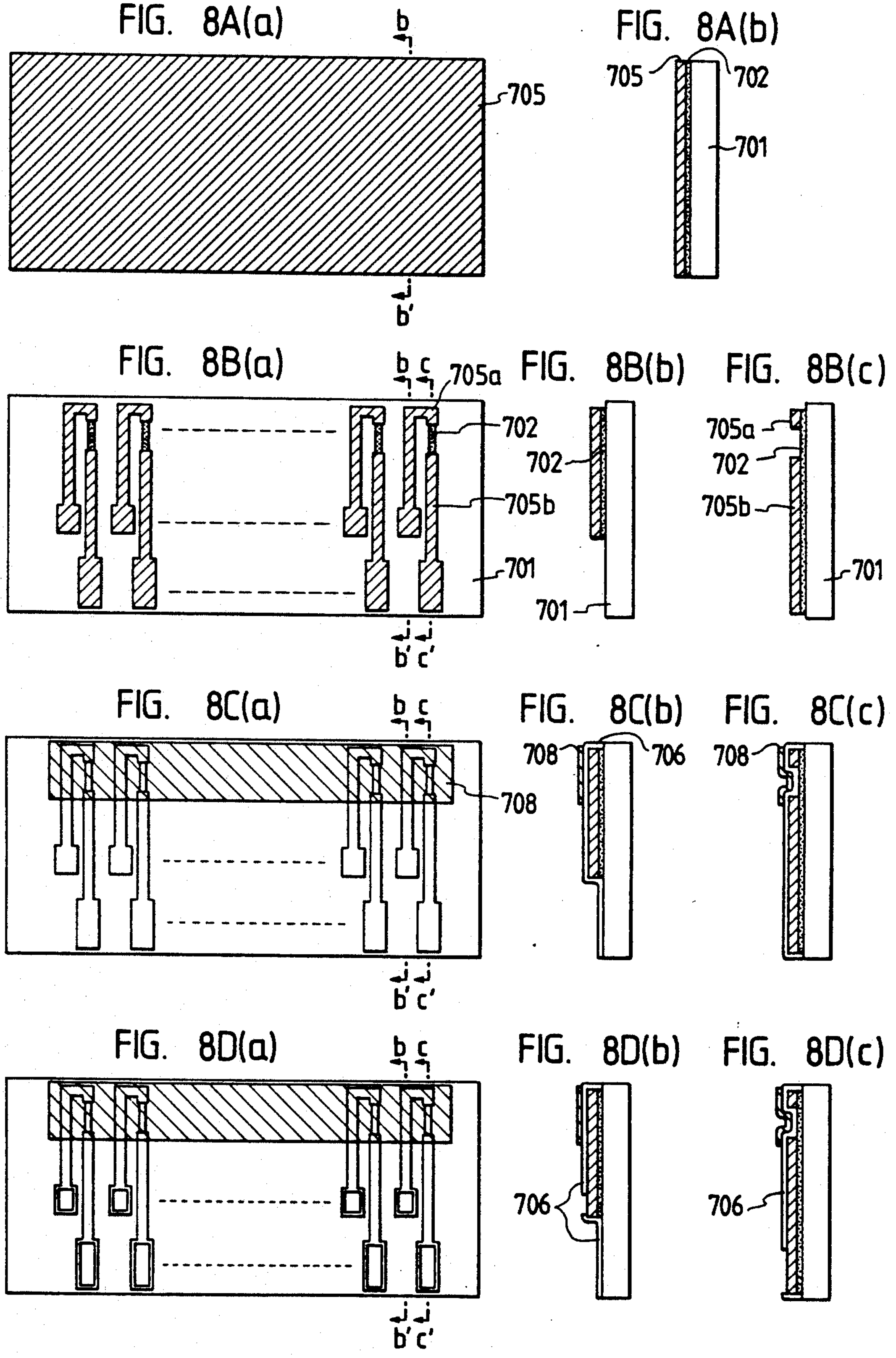
FIGS. 8A(*a*) to 8G(*c*) are diagrams for illustration of an example of the preparation steps of the recording element unit according to the third example of the present invention, (a) representing a top view, and (b) and (c) representing sectional views, respectively.

(1) First, an $HfB_2$ layer 702(thickness 350 Å), Ti layer (omitted in FIG. 8A)(thickness 50 Å) and Al layer 705(thickness 6000 Å) are formed on the whole substrate surface according to the sputtering method (FIG. 8A).

(2) For formation of the wiring substrate, a resist is coated on the film formed in (1) is, then subjected to patterning by exposure and development by use of the photolithographic method, and further, Al/Ti/$HfB_2$ layers are etched to form a wiring. The resist is peeled off after etching.

(3) On the Al/Ti/$HfB_2$ layer wiring electrode substrate formed in the above (2) is patterned a resist by use of the same photolithographic method as in (2) and further, Al is removed partially by etching to form a heater portion. The resist is peeled off after etching (FIG. 8B).

(4) $SiO_2$ layer 706(thickness 9000 Å) as the heater oxidation resistant layer and the interlayer insulating layer, $Ta_2O_5$ layer (omitted in FIG. 8C) (thickness: 500 Å) as the $SiO_2$-Ta adhering layer and Ta layer 708(thickness 5000 Å) as the cavitation resistant layer are formed on the whole substrate surface by continuous sputtering.

(5) According to the same method as in the above (2), resist is patterned and Ta is removed partially by etching to form a Ta pattern. The resist is peeled off after etching (FIG. 8C).

(6) According to the same method as in the above (2), resist was patterned and $SiO_2$ patterning is effected by removing partially $SiO_2$ by etching. The resist is peeled off after etching (FIG. 8C).

Figure 8E:
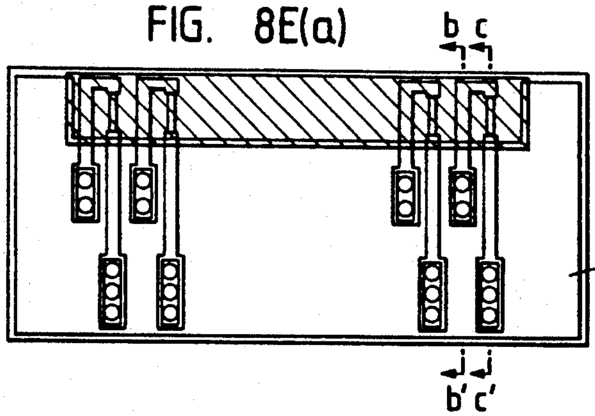
Figure 8E:
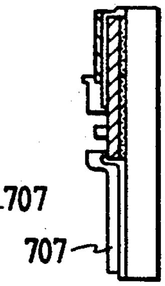
Figure 8E:
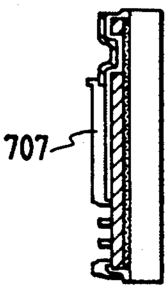
Figure 8F:
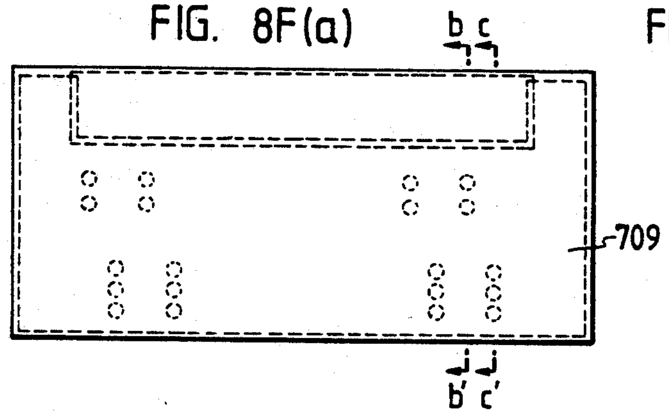
Figure 8F:
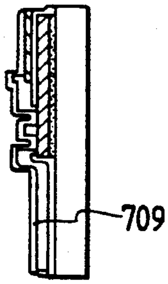
Figure 8F:
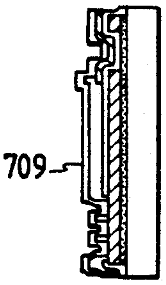

(7) An organic insulating film (film thickness 2.5 $\mu$m) as the ink resistant layer and the interlayer insulating layer is coated, and a pattern is formed according to the same method as in (2) or a pattern is formed by coating a photosensitive organic insulating film 707(film thickness 2.5 $\mu$m), followed by exposure and development (FIG. 8E).

(8) As the electroplated subbing layer 709, a Cu layer (thickness 3000 Å) and a Ti layer (thickness 500 Å) were formed on the whole substrate surface.

(9) A resist for formation of plating pattern is coated, exposed and developed.

(10) According to the electroplating, a conductive bump-shaped electrode 710 is formed with, for example, Cu, Ni, Au, Cr, Rh, etc. or a combination of these, and the resist is peeled off.

Figure 8G:
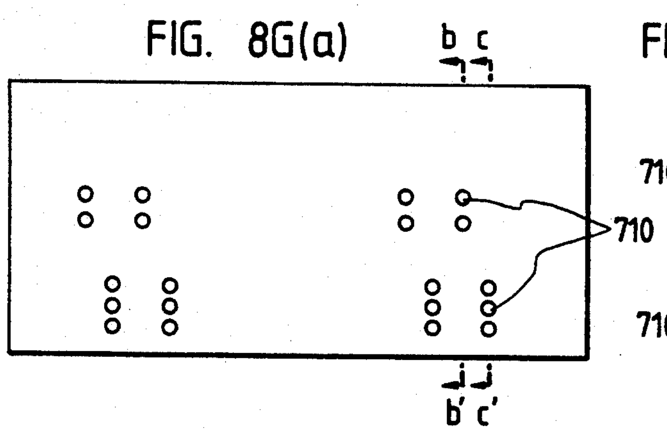
Figure 8G:
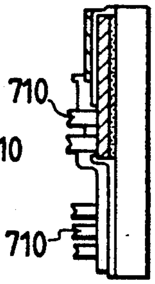
Figure 8G:
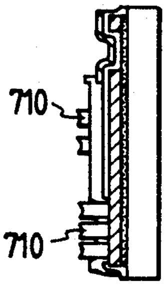

(11) Finally, the electroplated subbing layer is removed by etching (FIG. 8G). In this Example, first Cu was removed by dipping in 1 g/cc of ammonium persulfate for about 60 seconds, and subsequently Ti was removed by dipping in an 2% aqueous hydrofluoric acid solution for about 10 seconds.

By bonding a driving element substrate to such recording element unit similarly as described in the above Example 2, the recording element driving unit could be miniaturized.

Also, by forming a liquid channel communicating with a discharging opening for discharging ink on the recording element unit of this Example, the ink jet unit could be miniaturized.

By connecting electrically a driving element unit to the ink jet unit, an ink jet driving unit could be miniaturized.

Further, by preparing an ink jet recording device by use of the ink jet driving unit, the ink jet recording device could be miniaturized. Further, when recording test was conducted for the ink jet recording device, stable recording could be performed.

EXAMPLE 4

In the following, as a fourth example of the present invention, the case of forming a bump-shaped electrode according to the electroplating method by use of the pattern wiring as the electrode is to be described.

Figure 9A:
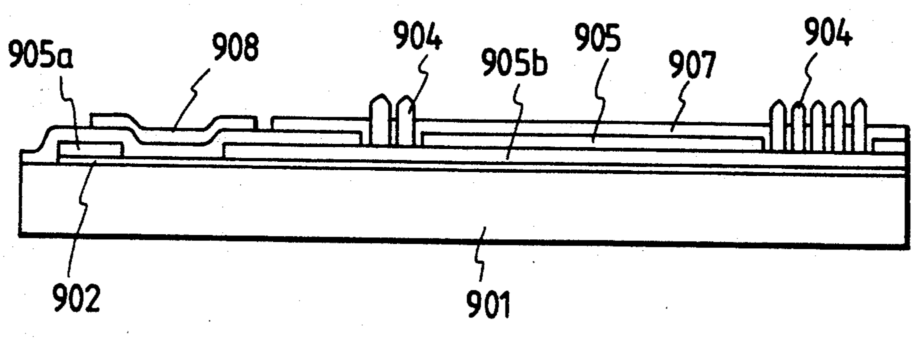
FIG. 9A and FIG. 9B are schematic sectional views showing the recording element unit according to a fourth example of the present invention, FIG. 9A representing a diagram showing the recording element unit having no common electrode, and FIG. 9B representing a diagram showing the recording element unit having a common electrode.
Figure 9B:
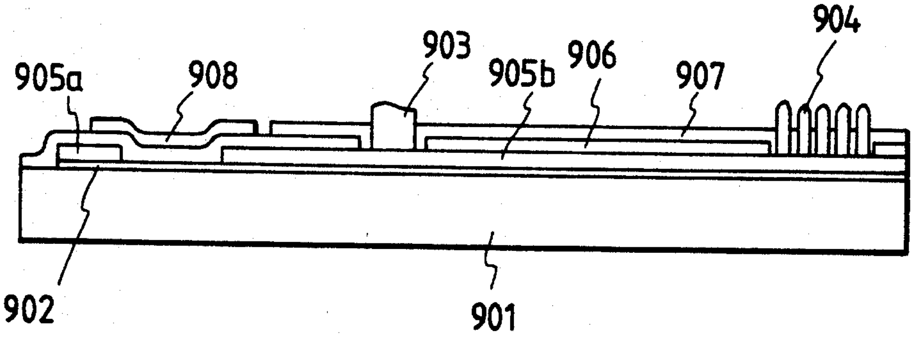

FIG. 9A and FIG. 9B are schematic sectional views showing the recording element unit according to this Example, FIG. 9A showing the recording element unit having no common electrode, and FIG. 9B the recording element unit having a common electrode. In FIG. 9A and FIG. 9B, 901 is a holding or support member, 902 is a $HfB_2$ layer as the heat-generating resistance layer, 903 is a common electrode of Cu, 904 is an individual electrode of Cu, 905*a* and 905*b* are pattern wirings of Cu, 906 is a $SiO_2$ layer as the oxidation resistant layer and the insulating layer, 907 is a photosensitive polyimide layer as the ink resistant layer and the insulating layer, and 908 is a Ta layer as the cavitation resistant layer.

As shown in FIG. 9A and FIG. 9B, in this Example, the sectional shape of the tip end of the bump-shaped electrode is convex.

Next, an example of the preparation steps of the recording element unit according this Example is described by referring to Example 10, by taking an example of the case having a common electrode.

Figure 10A:
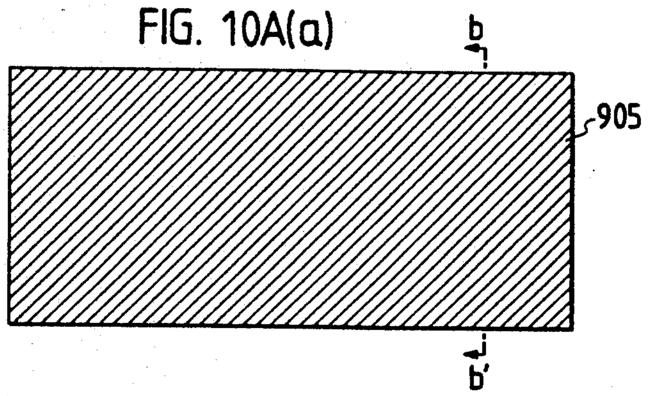
FIGS. 10A(*a*) to 10F(*c*) are diagrams for illustration of an example of the preparation steps of the recording element unit according to the fourth example of the present invention, (a) representing a top view, and (b) and (c) representing sectional views, respectively.
Figure 10A:
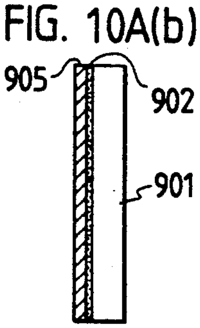

(1) First, the $HfB_2$ layer 902 (thickness 350 Å), Ti layer (omitted in FIG. 10) (thickness 50 Å) and the Cu layer (thickness 6000 Å) are formed on the whole substrate surface 901 according to the sputtering method (FIG. 10A).

(2) A resist is coated by use of the photolithographic method on the film formed in (1), is then subjected to patterning by exposure and development, and further, the Cu layer/Ti layer/$HfB_2$ layer are respectively etched to form a pattern wiring. The resist is peeled off after etching.

Figure 10B:
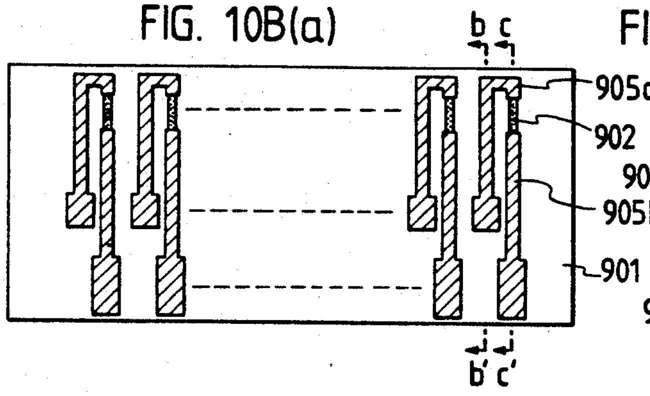
Figure 10B:
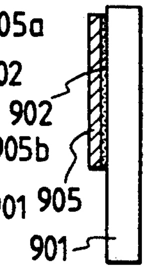
Figure 10B:
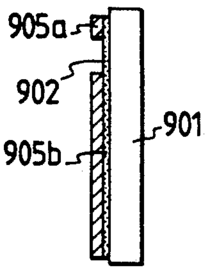

(3) On the Cu layer/Ti layer/$HfB_2$ layer wiring electrode substrate formed in the above (2) is patterned a resist by use of the same photolithographic method as in (2) and further, Cu is removed partially by etching to form a heater portion. The resist is peeled off after etching (FIG. 10B).

(4) $SiO_2$ layer 906 (thickness 9000 Å), as the heater oxidation resistant layer and the interlayer insulating layer, $Ta_2O_5$ layer (omitted in FIG. 10C) (thickness: 500 Å) as the $SiO_2$-Ta adhering layer and Ta layer (thickness 5000 Å) as the cavitation resistant layer are formed on the whole substrate surface by continuous sputtering.

Figure 10C:
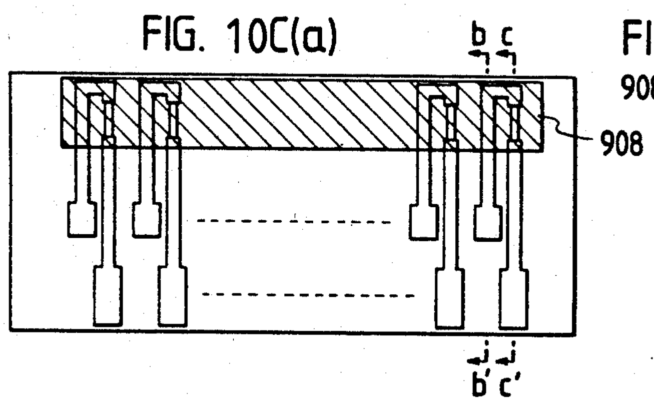
Figure 10C:
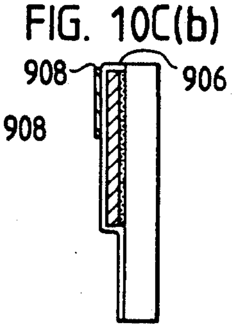
Figure 10C:
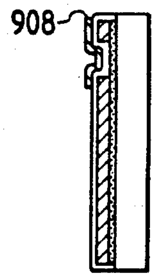

(5) According to the same method as in the above (2), the resist is patterned and Ta is removed partially by etching to form a Ta pattern. The resist is peeled off after etching (FIG. 10C).

Figure 10D:
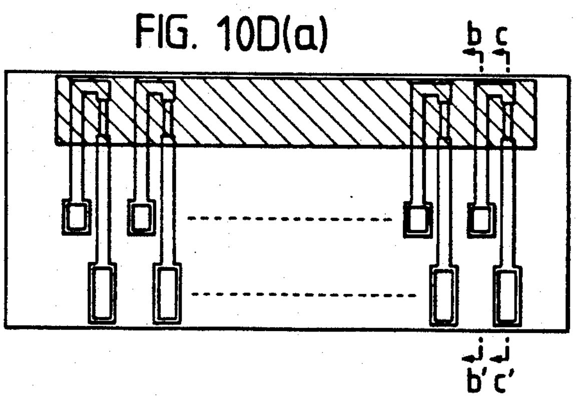
Figure 10D:
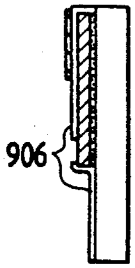
Figure 10D:
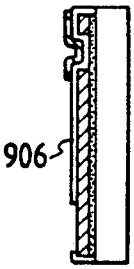

(6) According to the same method as in the above (2), the resist was patterned and $SiO_2$ patterning is effected by removing partially $SiO_2$ by etching. The resist is peeled off after etching (FIG. 10D).

Figure 10E:
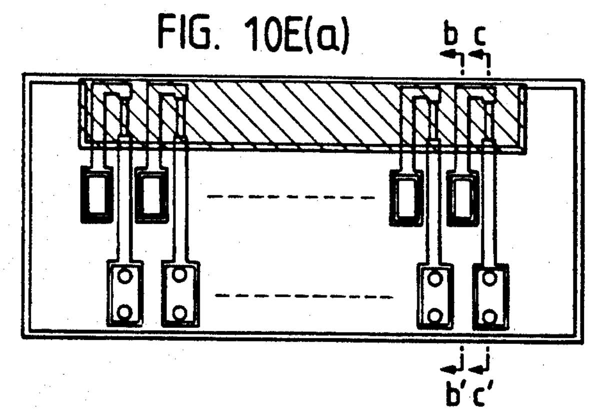
Figure 10E:
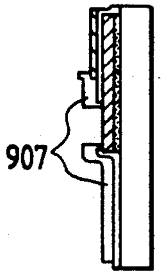
Figure 10E:
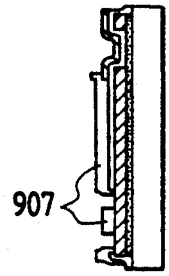

(7) An organic insulating film (film thickness 2.5 μm) as the ink resistant layer and the interlayer insulating layer is coated, and a pattern is formed according to the same method as in (2) or a pattern is formed by coating a photosensitive organic insulating film 907 (film thickness 2.5 μm), followed by exposure and development (FIG. 10E).

(8) Finally, according to the electroplating method, for example, conductive bump-shaped electrode 904 is formed with, for example, Cu, Ni, Au, Cr, Rh, etc. or a combination of these.

Figure 10F:
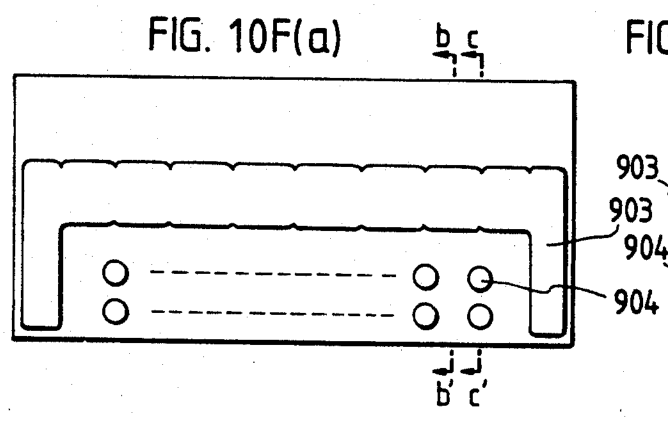
Figure 10F:
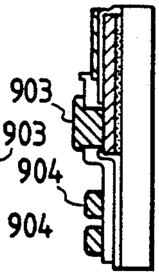
Figure 10F:
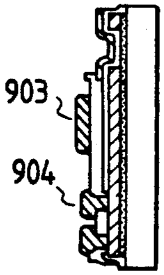

At this time, when the recording element unit has a common electrode, the common electrode 903 can be also formed simultaneously with the bump-shaped electrode 904. At this time, the plating grows initially per individual bit at the common electrode portion, but plating must be continued until plating between the adjacent bits is sufficiently connected. On the other hand, at this time the individual electrodes must be made so that no contact may occur between the adjacent bits (FIG. 10F).

An example of the preparation steps of the recording element of this Example has been described above.

Thus, the recording element unit of this Example requires none of the steps of forming an electroplated subbing layer on the whole substrate surface, patterning by coating of a resist and removing the resist by etching, etc. which have been required in the prior art in preparation thereof, and therefore could be prepared at very low cost.

Also, since a bump-shaped electrode with a convex sectional shape of the tip end could be formed, it has become possible to further lower the contact resistance of the bonding portion.

By bonding a driving element substrate to such recording element unit as shown in FIG. 1, a recording element driving unit with low contact resistance at the bonding portion could be prepared at a low cost.

Also, by forming a liquid channel communicating with a discharging opening for discharging ink in the recording element unit of this Example, an ink jet unit could be prepared at a low cost.

By connecting electrically a driving element unit to the ink jet unit, an ink jet driving unit with low contact resistance at the bonding portion could be prepared at a low cost.

Further, when an ink jet recording device was prepared at low cost with low contact resistance at the bonding portion by use of the ink jet driving unit and a recording test was conducted for the ink jet recording device, stable recording could be performed.

EXAMPLE 5

In the following, as a fifth example of the present invention, the case of having a bump-shaped electrode of an individual electrode formed long in the substrate thickness direction by providing newly an insulating layer on the surface of the recording element unit is to be described.

Figure 11:
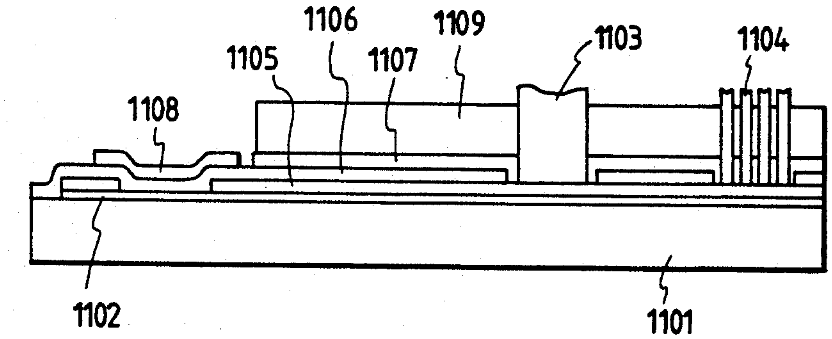
FIG. 11 is a schematic sectional view showing the recording element unit according to a fifth example of the present invention.

FIG. 11 is a schematic sectional view showing the recording element unit according to this Example. In FIG. 11, 1101 is a holding or support member, 1102 is a $HfB_2$ layer as the heat-generating resistance layer, 1103 is a common electrode of Al, 1104 is an individual electrode of Al, 1105 is a pattern wiring of Al, 1106 is a $SiO_2$ layer as the oxidation resistant layer and the insulating layer, 1107 is a photosensitive polyimide layer as the ink resistant layer and the insulating layer, 1108 is a Ta layer as the cavitation layer and 1109 is an insulating layer for forming the bump-shaped electrode of an individual electrode long in the substrate thickness direction. The insulating layer or section 1109 is of a greater thickness than the insulating section comprised of the oxidation resistant layer and insulating layer 1106 and/or the ink resistant layer and insulating layer 1107.

Since the bump-shaped electrode of individual electrode is formed long in the substrate thickness direction by providing thus the new insulating layer 1109 in the present invention, the influence from curving or warping of the substrate can be removed.

Next, an example of the preparation steps of the recording element unit according this Example is described by referring to FIGS. 12A–12G.

Figures 12A, 12B, 12C, 12D:
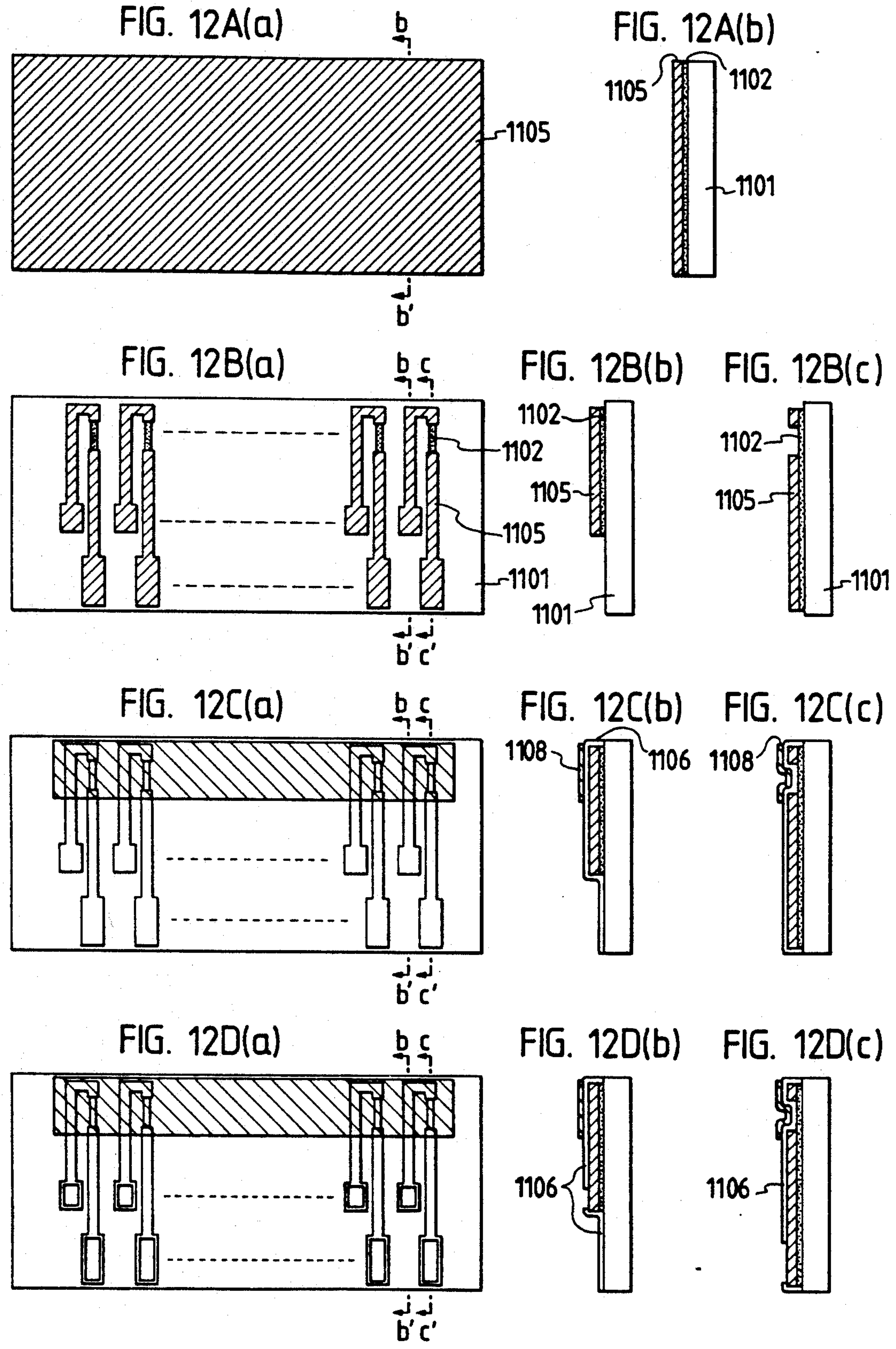
FIGS. 12A(*a*) to 12G(*c*) are diagrams for illustration of an example of the preparation steps of the recording element unit according to the fifth example of the present invention, (a) representing a top view, and (b) and (c) representing sectional views, respectively.

(1) First, an $HfB_2$ layer 1102 (thickness 350 Å), Ti a layer (omitted in FIG. 12A) (thickness 50 Å) and an Al layer (thickness 6000 Å) are formed on the whole substrate surface according to the sputtering method (FIG. 12A).

(2) For formation of the wiring substrate, a resist is coated by use of the photolithographic method on the film formed in (1), is then subjected to patterning by exposure and development, and further, Al layer/Ti layer/$HfB_2$ layer is etched to form a wiring. The resist is peeled off after etching.

(3) On the Al layer/Ti layer/$HfB_2$ layer wiring electrode substrate formed in the above step (2) is patterned a resist by use of the same photolithographic method as in (2) and further, Al is removed partially by etching to form a heater portion. The resist is peeled off after etching (FIG. 12B).

(4) $SiO_2$ an layer 1106 (thickness 9000 Å) as the heater oxidation resistant layer and the interlayer insulating layer, a $Ta_2O_5$ layer (omitted in FIG. 12C) (thickness: 500 Å) as the $SiO_2$-Ta adhering layer and a Ta layer 1108 (thickness 5000 Å) as the cavitation resistant layer are formed on the whole substrate surface by continuous sputtering.

(5) According to the same method as in the above (2), the resist is patterned and Ta is removed partially by etching to form a Ta pattern. The resist is peeled off after etching (FIG. 12C).

(6) According to the same method as in the above (2), the resist is patterned and $SiO_2$ patterning is effected by removing partially $SiO_2$ by etching. The resist is peeled off after etching (FIG. 12D).

Figure 12E:
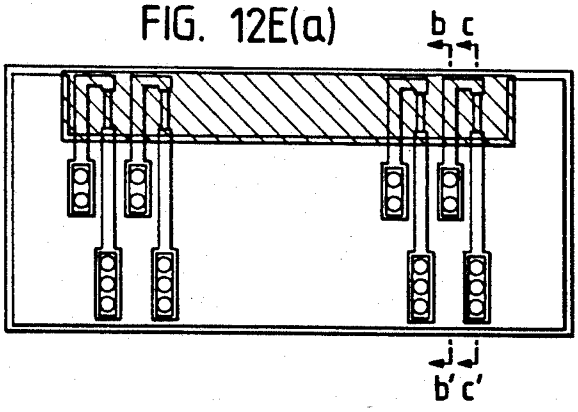
Figure 12E:
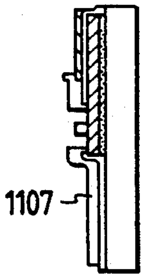
Figure 12E:
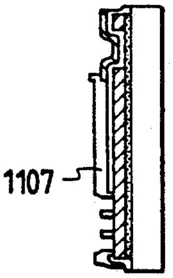
Figure 12F:
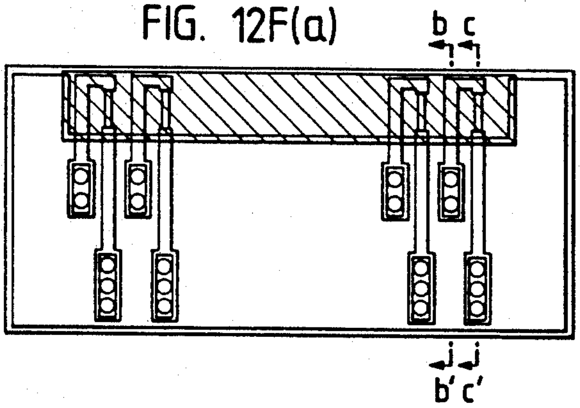
Figure 12F:
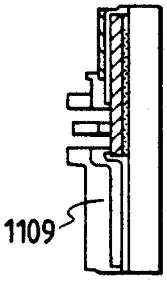
Figure 12F:
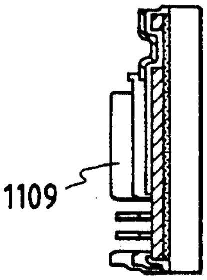

(7) An organic insulating film 1107 (film thickness 2.5 μm) as the ink resistant layer and the interlayer insulating layer is coated, and a pattern is formed according to the same method as in (2) or a pattern is formed by coating a photosensitive organic insulating film (film thickness 2.5 μm), followed by exposure and development (FIG. 12E).

(8) An insulating layer 1109 is formed by coating to form a pattern (some to some hundreds μm). The layer thickness may be as thick as possible within the range capable of forming a pattern. Since this layer is unnecessary for the heater portion, it is removed after layer formation.

(9) A cu layer (thickness 3000 Å) and a Ti layer (thickness 500 Å) as the electroplated subbing layer (omitted in FIG. 12F) are formed on the whole surface of the substrate.

(10) A resist for formation of plating pattern is coated, exposed and developed.

Figure 12G:
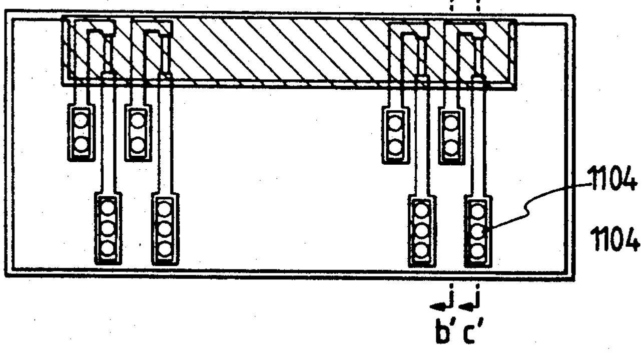
Figure 12G:
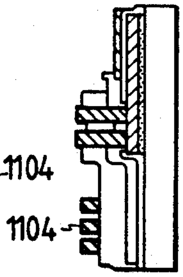
Figure 12G:
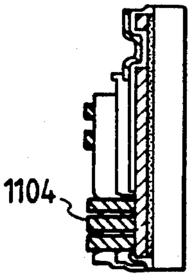

(11) Finally, according to the electroplating method, a conductive bump-shaped electrode 1104 is formed with, for example, Cu, Ni, Au, Cr, Rh, etc. or a combination of these, and the resist is peeled off (FIG. 12G).

An example of the preparation steps of the recording element of this Example has been described above.

By bonding a driving element substrate to such recording element unit as shown in Example 2, a recording element driving unit with excellent reliability of electrical connection could be prepared at a low cost.

Also, by forming a liquid channel communicating with a discharging opening for discharging ink in the recording element unit of this Example, an ink jet unit was prepared.

By connecting electrically a driving element unit to the ink jet unit, an ink jet driving unit was prepared.

Further, when an ink jet recording device was prepared by use of the ink jet driving unit and recording test was conducted for the ink jet recording device, stable recording could be performed.

EXAMPLE 6

In the following, as a sixth example of the present invention, the case of having a bump-shaped electrode of an individual electrode formed long in the substrate thickness direction by providing newly an insulating film on the surface of the recording element unit is to be described.

FIG. 13 is a schematic sectional view showing the recording element unit according to this Example. In FIG. 13, 1301 is a holding member, 1302 is a $HfB_2$ layer as the heat-generating resistance layer, 1303 is a common electrode of Al, 1304 is an individual electrode of Al, 1305 is a pattern wiring of Al, 1306 is a $SiO_2$ layer as the oxidation resistant layer and the insulating layer, 1307 is a photosensitive polyimide layer as the ink resistant layer and the insulating layer, 1308 is a Ta layer as the cavitation layer and 1309 is an insulating film for forming the bump-shaped electrode of individual electrode long in the substrate thickness direction.

Since the bump-shaped electrode of the individual electrode is formed long in the substrate thickness direction by providing thus a new insulating layer in the present invention, the influence from curving of the substrate can be removed.

Next, an example of the preparation steps of the recording element unit according to this Example is described by referring to FIGS. 14A–14G.

Figure 14A:
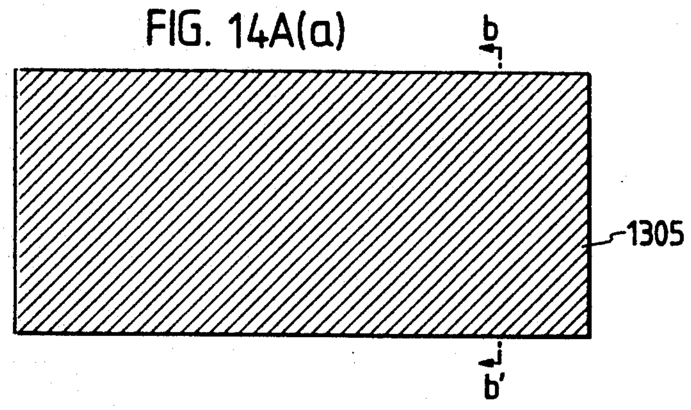
FIGS. 14A(*a*) to 14G(*c*) are diagrams for illustration of an example of the preparation steps of the recording element unit according to the sixth example of the present invention, (a) representing a top view, and (b) and (c) representing sectional views, respectively.
Figure 14A:
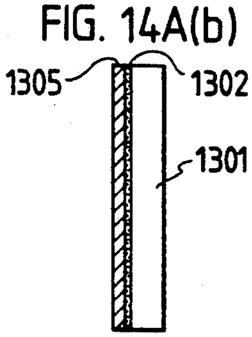

(1) First, a $HfB_2$ layer 1302 (thickness 350 Å), a Ti layer (omitted in FIG. 14A) (thickness 50 Å) and an Al layer 1305 (thickness 6000 Å) are formed on the whole substrate surface 1301 according to the sputtering method (FIG. 14A).

(2) For formation of the wiring substrate, a resist is coated by use of the photolithographic method on the film formed in (1) is, then subjected to patterning by exposure and development, and further, the Al layer/Ti layer/$HfB_2$ layer are etched to form a wiring. The resist is peeled off after etching.

Figure 14B:
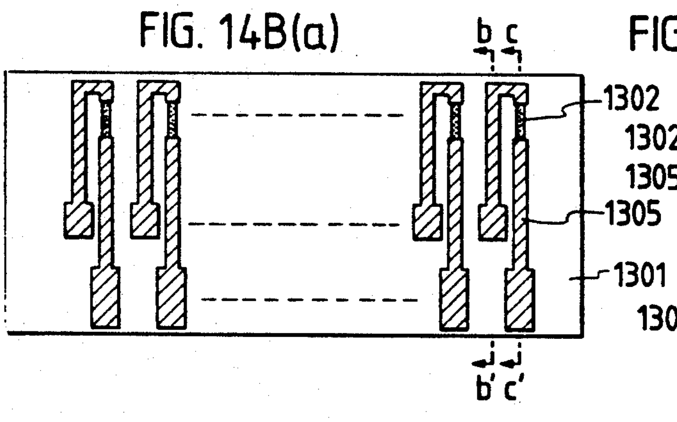
Figure 14B:
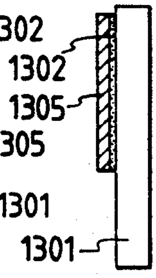
Figure 14B:
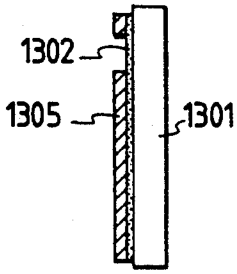

(3) On the Al layer/Ti layer/$HfB_2$ layer wiring electrode substrate formed in the above step (2) is patterned a resist by use of the same photolithographic method as in (2) and further, Al is removed partially by etching to form a heater portion. The resist is peeled off after etching (FIG. 14B).

(4) An $SiO_2$ layer 1306 (thickness 9000 Å) as the heater oxidation resistant layer and the interlayer insulating layer, a $Ta_2O_5$ layer (thickness: 500 Å) as the $SiO_2$-Ta adhering layer and a Ta layer 1308 (thickness 5000 Å) as the cavitation resistant layer are formed on the whole substrate surface by continuous sputtering.

Figure 14C:
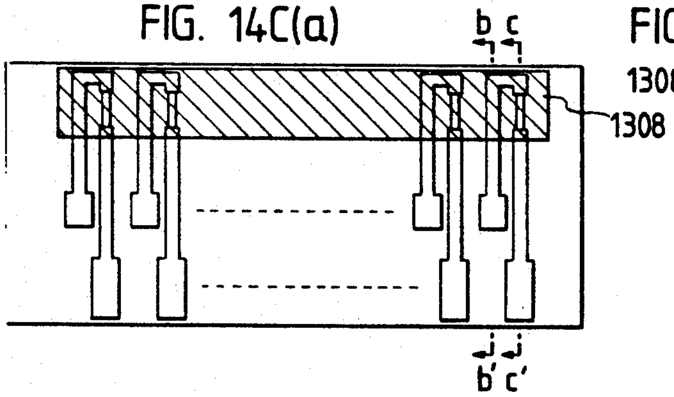
Figure 14C:
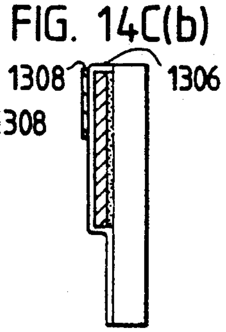
Figure 14C:
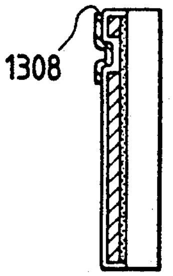

(5) According to the same method as in the above (2), the resist is patterned and the Ta is removed partially by etching to form a Ta pattern. The resist is peeled off after etching (FIG. 14C).

Figure 14D:
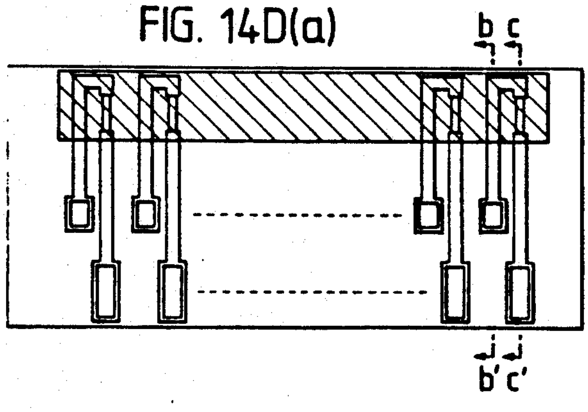
Figure 14D:
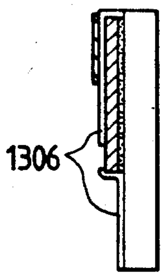
Figure 14D:
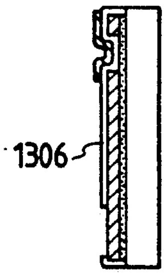

(6) According to the same method as in the above (2), the resist was patterned and $SiO_2$ patterning is effected by removing partially the $SiO_2$ by etching. The resist is peeled off after etching (FIG. 14D).

Figure 14E:
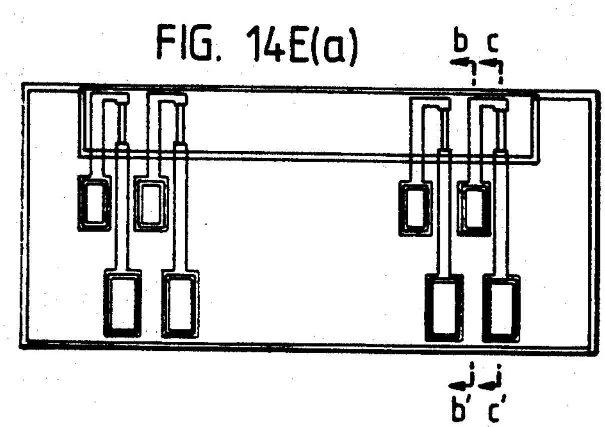
Figure 14E:
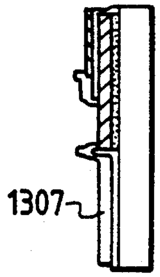
Figure 14E:
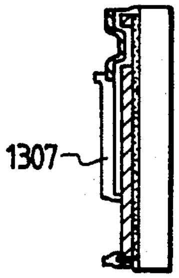
Figure 14F:
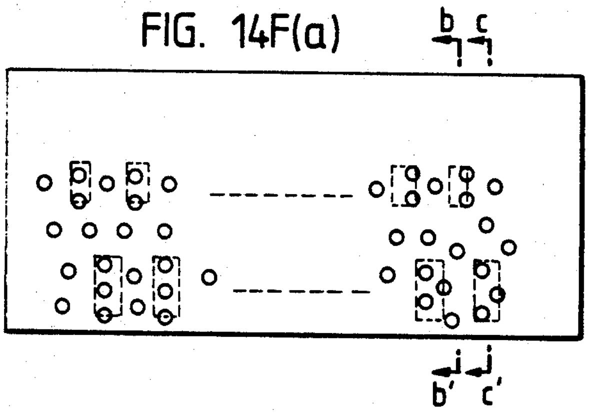
Figure 14F:
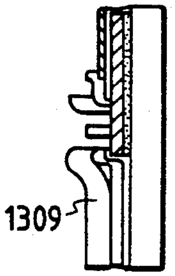
Figure 14F:
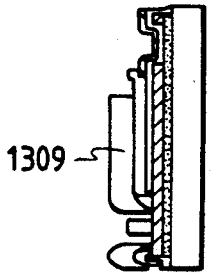
Figure 14G:
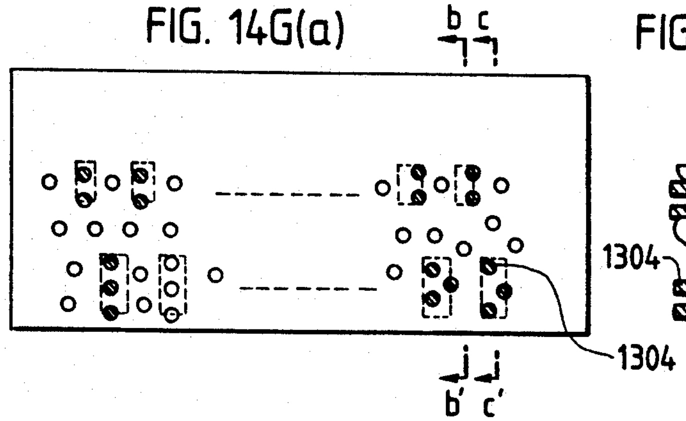
Figure 14G:
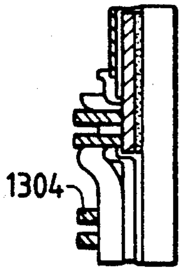
Figure 14G:
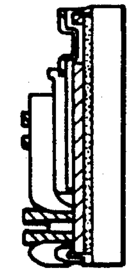

(7) an organic insulating film (film thickness 2.5 μm) as the ink resistant layer and the interlayer insulating layer is coated, and a pattern is formed according to the same method as in (2) or a pattern is formed by coating a photosensitive organic insulating film 1307 (film thickness 2.5 μm), followed by exposure and development (FIG. 14E).

(8) On the surface of the organic insulating film formed in the above step (2), an insulating film 1309 having thruholes is plastered.

(9) A Cu layer (thickness 3000 Å) and a Ti layer (thickness 500 Å) as the electroplated subbing layer is formed on the whole surface of the substrate.

(10) a resist for formation of plating pattern is coated, exposed and developed.

(11) Finally, according to the electroplating method, an electrode 1304 (bump-shaped electrode) is formed with, for example, Cu, Ni, Au, Cr, Rh, etc. or a combination of these, and the resist is peeled off (FIG. 14G).

An example of the preparation steps of the recording element of this Example has been described above.

By bonding a driving element substrate to such recording element unit as shown in Example 2, a recording element driving unit with excellent reliability of electrical connection at the bonding portion could be prepared at a low cost.

Also, by forming a liquid channel communicating with a discharging opening for discharging ink on the recording element unit of this Example, an ink jet unit was prepared.

By connecting electrically a driving element unit to the ink jet unit, an ink jet driving unit excellent in reliability of electrical connection was prepared.

Further, when an ink jet recording device was prepared by use of the ink jet driving unit and recording test was conducted for the ink jet recording device, stable recording could be performed.

EXAMPLE 7

As an example of the present invention, the recording element unit having a bump-shaped electrode electroconductive raised portion as the individual electrode 1504 having substantially the same constitution as shown in FIG. 19 (*a*) and 19 (*b*) will now be described.

First, an example of the preparation steps of the recording element unit according to the present invention are described below.

FIGS. 15A–15F are diagrams for illustration of the preparation steps of the recording element unit according to the present invention.

Figure 15A:
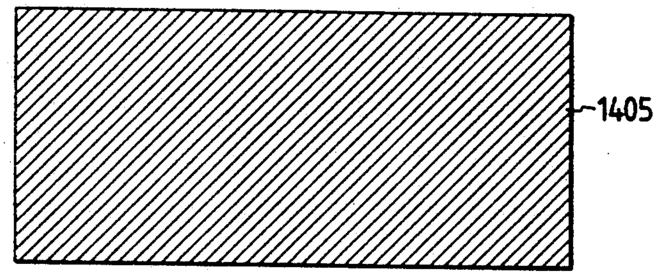
FIGS. 15A(*a*) to 15F(*c*) are diagrams for illustration of an example of the preparation steps of the recording element unit according to another example of the present invention, (a) representing a top view, and (b) and (c) representing sectional views, respectively.
Figure 15A:
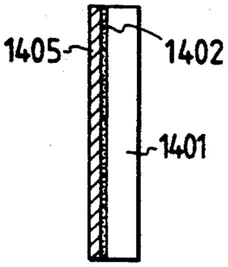

(1) First, $HfB_2$ 1402: 350 Å, Ti (omitted in FIG. 15A): 50 Å and Al 1405: 6000 Å are formed on the whole substrate surface 1401 according to the sputtering method (FIG. 15A).

(2) For formation of the wiring substrate, a resist is coated by use of the photolithographic method on the film formed in (1) is, then subjected to patterning by exposure and development, and further, Al/Ti/$HfB_2$ layers are etched to form a wiring. The resist is peeled off after etching.

Figure 15B:
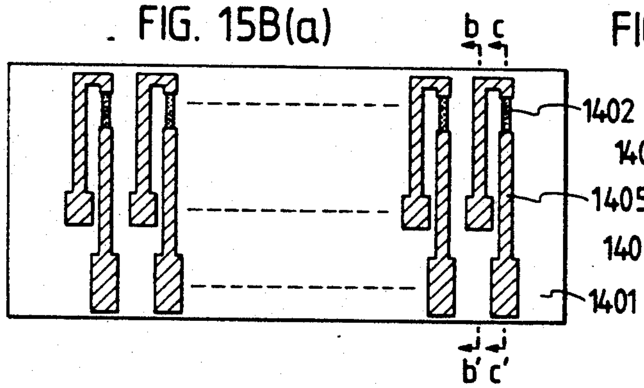
Figure 15B:
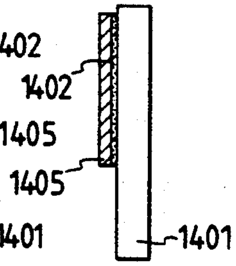
Figure 15B:
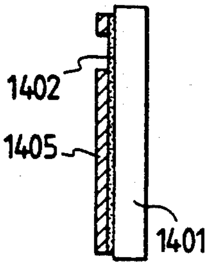

(3) On the Al/Ti/$HfB_2$ wiring electrode substrate formed in the above (2) is patterned a resist by use of the same photolithographic method as in (2) and further, Al is removed partially by etching to form a heater portion. The resist is peeled off after etching (FIG. 15B).

(4) $SiO_2$ 1406: 9000 Å as the heater oxidation resistant layer and the interlayer insulating layer, Ta205 (omitted in FIG. 15C): 500 Å as the SiO2-Ta adhering layer and Ta 1408: 5000 Å as the cavitation resistant layer are formed on the whole substrate surface by continuous sputtering.

Figure 15C:
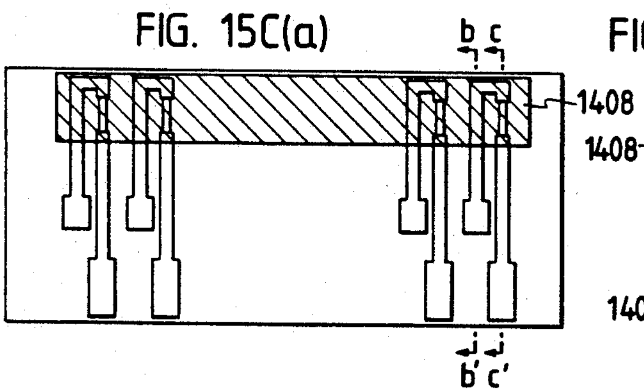
Figure 15C:
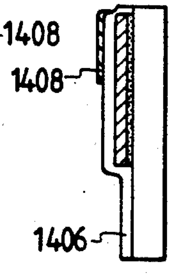
Figure 15C:
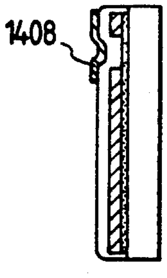

(5) According to the same method as in the above (2), the resist is patterned and Ta is removed partially by etching to form a Ta pattern. The resist is peeled off after etching (FIG. 15C).

Figure 15D:
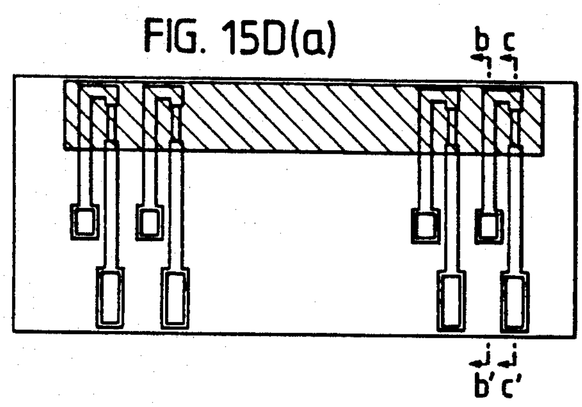
Figure 15D:
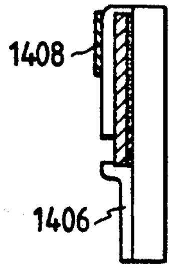
Figure 15D:
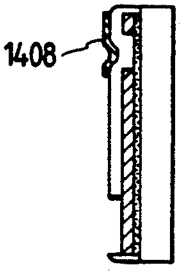

(6) According to the same method as in the above (2), the resist is patterned and $SiO_2$ patterning is effected by removing partially $SiO_2$ by etching. The resist is peeled off after etching (FIG. 15D).

Figure 15E:
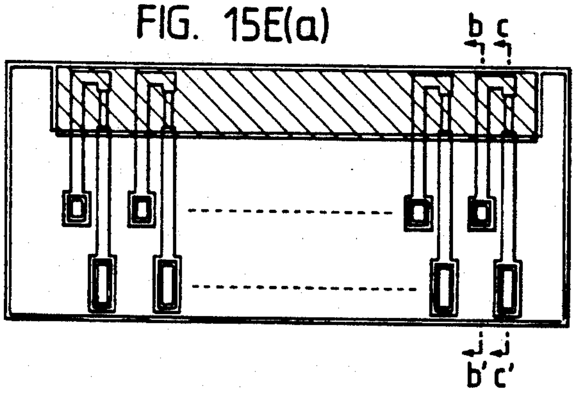
Figure 15E:
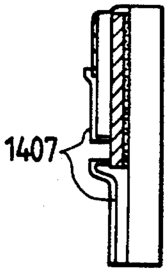
Figure 15E:
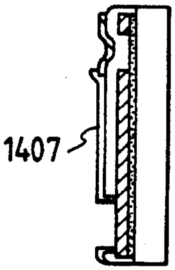

(7) An organic insulating film: 2.5 μm as the ink resistant layer and the interlayer insulating layer is coated, and a pattern is formed according to the same method as in (2) or a pattern is formed by coating a photosensitive organic insulating film 1407: 2.5 μm, followed by exposure and development (FIG. 15E).

(8) As the electroplated subbing layer (omitted in FIG. 15E), a Cu layer: 3000 Å and a Ti layer: 500 Å are formed on the whole substrate surface.

(9) A resist for formation of plating pattern is coated, exposed and developed.

Figure 15F:
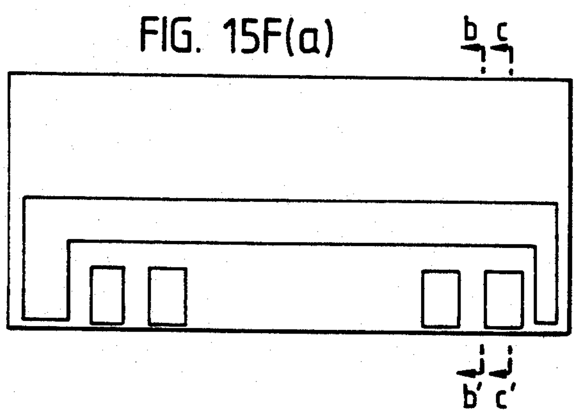
Figure 15F:
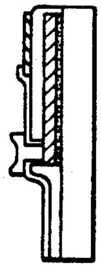
Figure 15F:
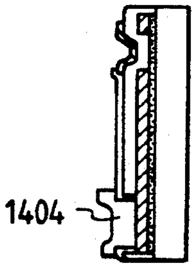

(10) According to the electroplating method, an electroconductive raised portion 1404 is formed with, for example, Cu, Ni, Au, Cr, Rh, etc. The film thickness is made several microns to some tens of microns. Finally, the resist is peeled off (FIG. 15F).

An example of the preparation of the device of this Example has been described.

Figure 16:
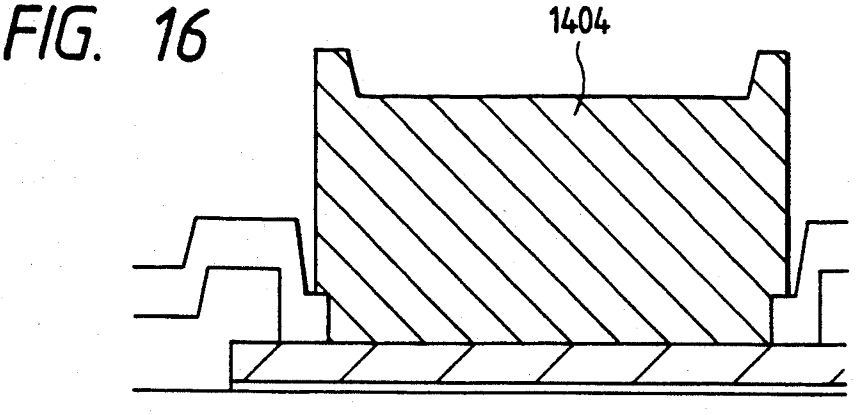
FIG. 16 is a schematic sectional view showing the bonding portion of the recording element unit according to the above another example of the present invention.

In this Example, the portion which becomes the bonding portion is the raised portion 1404. An enlarged view of this portion is shown in FIG. 16. By bonding this portion to the bonding portion of another substrate as shown in FIG. 1, electrical connection between two sheets of the substrate is effected.

Thus, according to the present invention, merely by bonding two sheets of substrate, an electrical connection of high reliability can be effected.

Figure 17:
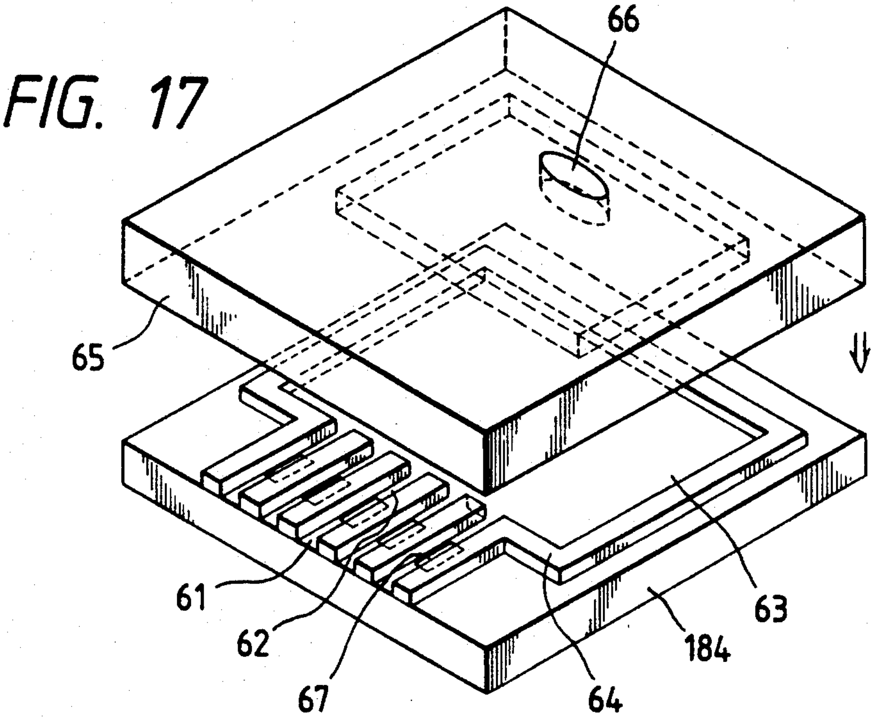
FIG. 17 is a schematic perspective exploded view showing an example of the head portion of the ink-jet unit and the ink-jet driving unit of the present invention.

FIG. 17 is a schematic exploded perspective view showing an example of the head portion of the ink jet unit and the ink jet driving unit according to the present invention.

In FIG. 17, the symbol 61 is a discharging opening, 62 denotes an ink channel communicating with the discharging opening 61, and 63 an ink chamber communicated to the ink channel 62. The liquid channel in this Example has an ink channel 62 and an ink chamber 63. In this Example, the ink channel 62 and the ink chamber 63 are formed by mutual bonding of the recording element substrate 184 (for better understanding of the description, length is drawn shorter), the wall forming member 64 and the covering member 65. Further in this Example, a heat-generating portion 67 is provided as the recording element corresponding to each ink channel 62, and electrodes (not shown in FIG. 17) are arranged at these heat-generating portions 67. The symbol 66 in FIG. 17 is an ink feeding opening to the ink chamber 63.

Figure 18:
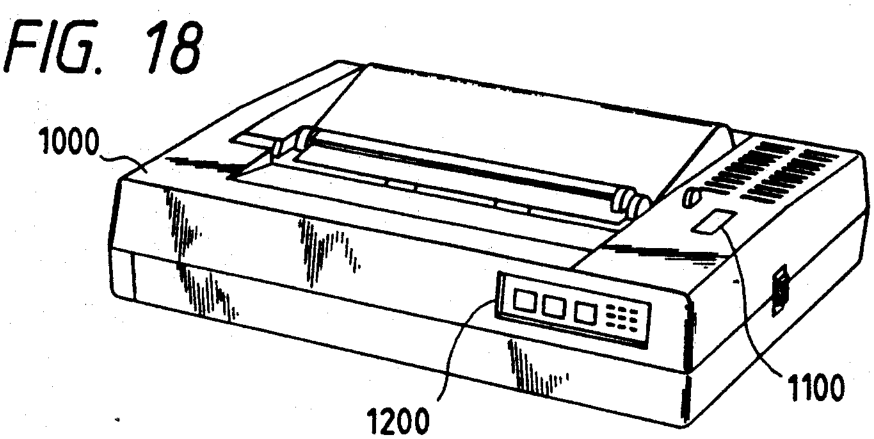
FIG. 18 is a schematic perspective view showing an example of the appearance of the ink-jet device according to the present invention.

FIG. 18 is a schematic perspective appearance view showing an example of the ink jet device according to the present invention. In FIG. 18, the symbol 1000 is the main body of the device, 1100 is the power source switch and 1200 is the panel for operation.

The present invention brings about excellent effects particularly in the recording head, recording device of the bubble jet system among ink jet recording systems.

As for its representative constitution and principle, for example, those by use of the basic principle disclosed in U.S. Pat. Nos. 4,723,129 and 4,740,796 are preferred. Although this system is applicable to either the on-demand type or the continuous type, particularly in the case of the on-demand type, it is effective because heat energy is generated in the electricity-heat converter by applying at least one driving signal which gives abrupt temperature elevation in excess of nucleus boiling corresponding to the recording information to the electricity-heat converter arranged corresponding to the sheet or the liquid channel where liquid (ink) is held, thereby effecting film boiling on the heat-acting surface of the recording head, resulting in the formation of bubbles within the liquid (ink) corresponding, one by one, to the driving signal. By discharging liquid (ink) through the opening for discharging by growth and shrinkage of the bubble, at least one droplet is formed. When the driving signal is made pulse-shaped, adequate growth and shrinkage of bubble can be preferably effected to accomplish discharging of liquid (ink) particularly excellent in response characteristic. As the pulse-shaped driving signal, those disclosed in U.S. Pat. Nos. 4,463,359 and 4,345,262 are suitable. By employment of the conditions as disclosed in U.S. Pat. No. 4,313,124 of the invention concerning temperature elevation rate of the above heat-acting surface, further excellent recording can be performed.

As the constitution of the recording head, in addition to the constitution comprising a combination of discharging opening, liquid channel and electricity-heat converter (linear liquid channel or right angle liquid channel), the constitution utilizing U.S. Pat. No. 4,558,333 or 4,459,600 disclosing a heat-acting portion arranged in a flexed region is also included in the present invention. In addition, the present invention is also effective for such constitution as based on Japanese Unexamined Patent Publication No. 59-123670 disclosing a device comprising a common slit as the discharging portion of electricity-heat converter for a plurality of electricity-heat converters or Japanese Unexamined Patent Publication No. 59-138461 disclosing a device having an opening which absorbs a pressure wave of heat energy corresponding to the discharging portion.

Further, as the recording head of the full line type having a length corresponding to the width of the maximum recording medium which can be recorded by the recording device, either constitution satisfying its length or constitution as one recording head integrally formed may be employed according to a combination of a plurality of recording heads as disclosed in the specifications as described above, and the present invention can exhibit the effects as described above more effectively.

In addition, the present invention is also effective for the case of using a freely exchangeable recording head of the chip type in which the electrical connection with the main device or feeding of ink from the main device becomes possible by mounting onto the main device, or the case of using a recording head of the cartridge type provided integrally with the recording head itself.

Also, addition of a restoration means, preliminary auxiliary means, etc. for the recording head provided as the constitution of the recording device of the present invention is preferable in stabilizing further the effects of the present invention. These may specifically include capping means, cleaning means, pressurization or absorption means, preliminary heating means using electicity-heat converter, heating means separate from this or the combination of these, and performing of preliminary discharging mode separate from recording are also effective for stable recording.

Further, as the recording mode of the recording device, not only the recording mode only of the main color such as black, etc., but a constitution constituting integrally the recording head or a plurality of colors may be employed, and for a device provided with at least one of complex colors with different colors or full color by color mixing, the present invention is extremely effective.

(1) As described above, according to the present invention, since electrical connection of substrates can be effected merely by bonding the recording element substrate to the driving element substrate, it therefore becomes possible to permit the bonding portions of the recording element substrate and the driving element substrate to exist at high density, whereby it becomes possible to increase the number of the bonding portions of the driving element substrates and effect a higher density device. This also leads to miniaturization of even a lengthy unit.

Also, since no part for electrical connection is required, the unit can be made thinner and lower in cost.

Further, since the amount of the metal member used for the raised portion of the recording element unit, even if an expensive metal such as gold, etc. is small, cost reduction is possible.

Also, since at least one surplus recording element than is necessary is provided and since at least one surplus pattern wiring corresponding to the recording elements can be provided, and further since at least one surplus driving element than is necessary is provided and since at least one surplus pattern wirings of the driving element substrate can be provided, bonding becomes possible without performing registration or without requiring high precision registration, if any.

Particularly in the case when the ink jet is a bubble ink jet, registration can be done with difficulty because higher density wiring is demanded, but according to the present invention, registration can be done with extreme ease even in the case of such high density wiring.

Further, in the present invention, the recording element substrate and the driving element substrate can be bonded freely detachably, and the driving element substrate can be easily separated and hence also exchanged easily.

(2) According to the present invention, by providing a common electrode on the driving element substrate, further miniaturization of the recording element unit as well as the recording element driving unit, the ink jet unit, the ink jet driving unit and the ink jet recording device by use thereof becomes possible.

Particularly, when a bubble ink jet system is employed as the ink jet recording system, very high density wiring is demanded, and the present invention can obtain a particularly great effect in the case of such high density wiring.

(3) According to the present invention, by forming bump-shaped electrodes by use of the electroplating method with pattern wirings as electrodes, the recording element unit as well as the recording element driving unit, the ink jet unit, the ink jet driving unit and the ink jet recording device can be provided at low cost. Further, a recording element driving unit, an ink jet driving unit and an ink jet recording device with low contact resistance at the bonding portion of the recording element substrate and the driving element substrate can be provided.

(4) According to the present invention, since the influence from curving or unevenness of the substrate can be removed, an electrical connection of high reliability can be effected even in a length unit simply and at low cost.

Particularly, when the recording element unit or the ink jet unit is lengthy, a great effect can be obtained.

What is claimed is:

1. A recording element unit comprising:

a support member;

a recording element provided on said support member, said recording element having a wiring layer for supplying electrical signals, a first insulating section provided above said wiring layer, said first insulating section including at least one insulating layer, and a second insulating section provided above said first insulating section, said second insulating section having a thickness greater than that of said first insulating section for providing structural strength to said support member to prevent said support member from warping; and a bump-shaped electrode connected to said wiring layer through a plurality of openings in said first and second insulating sections so as to be raised from said wiring layer, wherein said bump-shaped electrode comprises a plurality of raised portions provided through said openings in said first and second insulating sections, each raised portion corresponding to one of said openings.

2. A recording element unit according to claim 1, wherein said recording element has a heat-generating resistance layer connected to said wiring layer, and is an electro-thermal converting means for generating heat energy.

3. A recording element driving unit comprising:

a recording element unit having:

a support member, a recording element provided on said support member, said recording element having a wiring layer for supplying electrical signals, a first insulating section provided above said wiring layer, said first insulating section including at least one insulating layer, and a second insulating section provided above said first insulating section, said second insulating section having a thickness greater than that of said first insulating section for providing structural strength to said support member to prevent said support member from warping, and a bump-shaped electrode connected to said wiring layer through a plurality of openings in said first and second insulating sections so as to be raised from said wiring layer, wherein said bump-shaped electrode comprises a plurality of raised portions provided through said openings in said first and second insulating sections, each raised portion corresponding to one of said openings; and a driving element substrate having a driving element and a wiring layer connected to said driving element, said bump-shaped electrode being connected to said wiring layer of said driving element substrate.

4. A recording element driving unit according to claim 3, wherein said recording element has a heat-generating resistance layer connected to said wiring layer, and is an electro-thermal converting member for generating heat energy.

5. An ink jet unit comprising:

a support member;

a recording element provided on said support member, said recording element having a wiring layer for supplying electrical signals, a first insulating section provided above said wiring layer, said first insulating section including at least one insulating layer, and a second insulating section provided above said first insulating section, said second insulating section having a thickness greater than that of said first insulating section for providing structural strength to said support member to prevent said support member from warping;

a bump-shaped electrode connected to said wiring layer through a plurality of openings in said first and second insulating sections so as to be raised from said wiring layer, wherein said bump-shaped electrode comprises a plurality of raised portions provided through said openings in said first and second insulating sections, each raised portion corresponding to one of said openings; and a liquid channel communicating with a discharging opening for discharging ink provided corresponding to an energy generating portion of said recording element.

6. An ink jet unit according to claim 5, wherein said recording element has a heat-generating resistance layer connected to said wiring layer and is an electro-thermal converting member for generating heat energy, and ink is discharged through said discharging opening by utilizing said heat energy.

7. An ink jet driving unit comprising:

a recording element including:

a support member, a recording element provided on said support member, said recording element having a wiring layer for supplying electrical signals, a first insulating section provided above said wiring layer, said first insulating section including at least one insulating layer, and second insulating section provided above said first insulating section, said second insulating section having a thickness greater than that of said first insulating section for providing structural strength to said support member to prevent said support member from warping, and a bump-shaped electrode connected to said wiring layer through a plurality of openings in said first and second insulating sections so as to be raised from said wiring layer, wherein said bump-shaped electrode comprises a plurality of raised portions provided through said openings in said first and second insulating sections, each raised portion corresponding to one of said openings;

a driving element substrate having a driving element and a wiring layer connected to said driving element, said bump-shaped electrode being connected to said wiring layer of said driving element substrate; and a liquid channel communicating with a discharging opening for discharging ink being provided corresponding to an energy generating portion of said recording element.

8. An ink jet driving unit according to claim 7, wherein said recording element has a heat-generating resistance layer connected to said wiring layer and is an electro-thermal converting member for generating heat energy, and ink is discharged through said discharging opening by utilizing said heat energy.

9. An ink jet recording apparatus comprising:

an ink jet driving unit comprising:

a recording element unit including:

a support member, a recording element provided on said support member, said recording element having a wiring layer for supplying electrical signals, a first insulating section provided above said wiring layer, said first insulating section including at least one insulating layer, and a second insulating section provided above said first insulating section, said second insulating section having a thickness greater than that of said first insulating section for providing structural strength to said support member to prevent said support member from warping, and a bump-shaped electrode connected to said wiring layer through a plurality of openings in said first and second insulating sections so as to be raised from said wiring layer, wherein said bump-shaped electrode comprises a plurality of raised portions provided through said openings in said first and second insulating sections, each raised portion corresponding to one of said openings;

a driving element substrate having a driving element and a wiring layer connected to said driving element, said bump-shaped electrode being connected to said wiring layer of said driving element substrate;

a liquid channel communicating with a discharging opening for discharging ink being provided corresponding to an energy generating portion of said recording element; and a member for mounting said ink jet driving unit.

* * * * *

UNITED STATES PATENT AND TRADEMARK OFFICE
CERTIFICATE OF CORRECTION

PATENT NO. : 5,243,363

DATED : September 7, 1993

INVENTOR(S) : Yutaka KOIZUMI, et al.

It is certified that error appears in the above-identified patent and that said Letters Patent is hereby corrected as shown below:

On the Title Page, Item [56]:

"Journal,," should read --Journal,--.

COLUMN 2:

Line 10, "method" should read --method.--.

COLUMN 5:

Line 20, "invention." should read --invention;--;

Line 23, "invention." should read --invention;--.

COLUMN 6:

Line 24, "formed" (first occurrence) should be deleted;

Line 39, "substrate 114." should read --substrate 104.--;

Line 58, "705b" should read --705b,--.

UNITED STATES PATENT AND TRADEMARK OFFICE
CERTIFICATE OF CORRECTION

PATENT NO. : 5,243,363 — Page 2 of 6

DATED : September 7, 1993

INVENTOR(S) : Yutaka KOIZUMI, et al.

It is certified that error appears in the above-identified patent and that said Letters Patent is hereby corrected as shown below:

COLUMN 7:

Line 26, "resin phenol" should read --resin, phenol--;

Line 34, "may" should read --but may--;

Line 53, "FIG." (second occurrence) should read --Figure,--.

COLUMN 8:

Line 9, "703-704" should read --703, 704--;

Line 13, "703-704" should read --703, 704--;

Line 18, "703-704" should read --703, 704--; and "substrate" should read --substrate 104--;

Line 21, "703-704" should read --703, 704--;

Line 22, "substrate" should read --substrate 104--;

Line 33, "the" should be deleted;

Line 51, "electrode" should read --electrodes--;

Line 62, "different" should read --comprise different--.

UNITED STATES PATENT AND TRADEMARK OFFICE
CERTIFICATE OF CORRECTION

PATENT NO. : 5,243,363

DATED : September 7, 1993

INVENTOR(S) : Yutaka KOIZUMI, et al.

It is certified that error appears in the above-identified patent and that said Letters Patent is hereby corrected as shown below:

COLUMN 9:

Line 2, "104 element substrate" should read --element substrate 104--;

Line 21, "bonding. (Bonding" should read --bonding. ¶ (Bonding-- (new heading);

Line 57, "unit" should read --unit 408, shown in FIG. 4--.

COLUMN 10:

Line 23, "substrate" should read --substrate 104--;

Line 24, "substrate" should read --substrate 105--;

Line 32, "electrode" should read --electrode 703, 704--;

Line 60, "705a or 705b" should read --705a, 705b--;

Line 62, "wirings," should read --wirings 705a, 705b,--; and "705a, 705b" should be deleted.

COLUMN 11:

Line 11, "by and" should read --and by--;

Line 33, "creased." should read --increased.--;

Line 48, "at" should read --a--.

UNITED STATES PATENT AND TRADEMARK OFFICE
CERTIFICATE OF CORRECTION

PATENT NO. : 5,243,363

DATED : September 7, 1993

INVENTOR(S) : Yutaka KOIZUMI, et al.

It is certified that error appears in the above-identified patent and that said Letters Patent is hereby corrected as shown below:

COLUMN 12:

Line 32, "completely" should read --be a completely--.

COLUMN 13:

Line 3, "708 layer" should read --708--;
Line 16, "these" should read --this--.

COLUMN 14:

Line 34, "are" should --and--.

COLUMN 15:

Line 19, "Figure," should read --the Figure,--;
Line 42, "A" should be deleted.

COLUMN 16:

Line 12, "705b" should read --705b are--;
Line 19, "according" should read --according to--;
Line 27, "(1) is," should read --(1), is--.

UNITED STATES PATENT AND TRADEMARK OFFICE
CERTIFICATE OF CORRECTION

PATENT NO. : 5,243,363

DATED : September 7, 1993

INVENTOR(S) : Yutaka KOIZUMI, et al.

It is certified that error appears in the above-identified patent and that said Letters Patent is hereby corrected as shown below:

COLUMN 19:

Line 27, "according" should read --according to--;

Line 46, "(4)$SiO_2$ an" should read --(4) An $SiO_2$--.

COLUMN 20:

Line 2, "(some to some hundreds μm)." should read --(some tens to some hundreds μm).--;

Line 7, "cu layer" should read --Cu layer--;

Line 68, "(1) is," should read --(1), is--.

COLUMN 21:

Line 37, "(10) a resist" should read --(10) A resist--.

COLUMN 22:

Line 13, "(1) is," should read --(1), is--;

Line 23, "Ta205" should read --$Ta_2O_5$--;

Line 24, "SiO2-Ta" should read --$SiO_2$-Ta--.

UNITED STATES PATENT AND TRADEMARK OFFICE
CERTIFICATE OF CORRECTION

PATENT NO. : 5,243,363 Page 6 of 6

DATED : September 7, 1993

INVENTOR(S) : Yutaka KOIZUMI, et al.

It is certified that error appears in the above-identified patent and that said Letters Patent is hereby corrected as shown below:

COLUMN 23:

Line 1, "63 an" should read --63 denotes an--;

Line 2, "cated to" should read --cating with--.

COLUMN 25:

Line 28, "length" should read --lengthy--.

Signed and Sealed this

Twelfth Day of July, 1994

Attest:

Bruce Lehman

BRUCE LEHMAN

Attesting Officer

Commissioner of Patents and Trademarks